(12) United States Patent
Noda et al.

(10) Patent No.: US 9,303,197 B2
(45) Date of Patent: Apr. 5, 2016

(54) ANTISTATIC AGENT AND ANTISTATIC RESIN COMPOSITION

(75) Inventors: Hidetoshi Noda, Kyoto (JP); Masanori Hattori, Kyoto (JP); Eri Takemoto, Kyoto (JP)

(73) Assignee: SANYO CHEMICAL INDUSTRIES, LTD., Kyoto (JP)

( * ) Notice: Subject to any disclaimer, the term of this patent is extended or adjusted under 35 U.S.C. 154(b) by 487 days.

(21) Appl. No.: 13/806,850

(22) PCT Filed: Jun. 30, 2011

(86) PCT No.: PCT/JP2011/003757
§ 371 (c)(1),
(2), (4) Date: Dec. 26, 2012

(87) PCT Pub. No.: WO2012/001984
PCT Pub. Date: Jan. 5, 2012

(65) Prior Publication Data
US 2013/0102710 A1    Apr. 25, 2013

(30) Foreign Application Priority Data

Jun. 30, 2010    (JP) .................................. 2010-150203

(51) Int. Cl.
| | | |
|---|---|---|
| *C09K 3/16* | (2006.01) |
| *C08L 101/02* | (2006.01) |
| *C08L 101/12* | (2006.01) |
| *C08L 23/28* | (2006.01) |
| *C08L 53/00* | (2006.01) |
| *C08L 25/06* | (2006.01) |
| *C08L 77/12* | (2006.01) |
| *C08L 23/10* | (2006.01) |
| *C08L 71/02* | (2006.01) |

(52) U.S. Cl.
CPC . *C09K 3/16* (2013.01); *C08L 23/10* (2013.01); *C08L 25/06* (2013.01); *C08L 53/00* (2013.01); *C08L 71/02* (2013.01); *C08L 77/12* (2013.01); *C08G 2261/126* (2013.01); *C08L 2201/04* (2013.01)

(58) Field of Classification Search
None
See application file for complete search history.

(56) References Cited

U.S. PATENT DOCUMENTS

| | | | |
|---|---|---|---|
| 3,692,877 A | | 9/1972 | Shibahara et al. |
| 6,552,131 B1 * | | 4/2003 | Higuchi et al. ............... 525/240 |
| 2003/0138580 A1 * | | 7/2003 | Blong ........................ 428/36.9 |
| 2004/0254268 A1 * | | 12/2004 | Cernohous et al. ............. 524/9 |
| 2010/0119751 A1 * | | 5/2010 | Lanier ........................ 428/36.9 |

FOREIGN PATENT DOCUMENTS

| | | |
|---|---|---|
| JP | 03-062804 | 3/1991 |
| JP | 03-258850 | 11/1991 |
| JP | 06-345927 | 12/1994 |
| JP | 08-012755 | 1/1996 |
| JP | 2001-278975 | 10/2001 |
| JP | 3488163 | 1/2004 |

* cited by examiner

*Primary Examiner* — Jeffrey Mullis
(74) *Attorney, Agent, or Firm* — Jianq Chyun IP Office

(57) ABSTRACT

Disclosed are an antistatic agent which does not impair the appearance and the mechanical strength of a molded article and which provides sufficient permanent antistatic properties to the molded article even when added in a small amount, and an antistatic resin composition containing the same. The antistatic agent (Z) includes: a block polymer (A) containing a block of hydrophobic polymer (a) and a block of hydrophilic polymer (b) as constituent units; and an organic fluorine-modified polyolefin (B). The antistatic resin composition is obtained by containing the antistatic agent in a thermoplastic resin (C).

18 Claims, No Drawings

ANTISTATIC AGENT AND ANTISTATIC RESIN COMPOSITION

CROSS-REFERENCE TO RELATED APPLICATION

This application is a 371 of international application of PCT application serial no. PCT/JP2011/003757, filed on Jun. 30, 2011, which claims the priority benefit of Japan application no. 2010-150203, filed on Jun. 30, 2010. The entirety of each of the above-mentioned patent applications is hereby incorporated by reference herein and made a part of this specification.

BACKGROUND OF THE INVENTION

1. Field of the Invention

The invention relates to an antistatic agent and an antistatic resin composition. More particularly, the invention relates to an antistatic agent which does not impair the mechanical property or good appearance of a molded article formed by molding a thermoplastic resin composition and which provides the molded article with an excellent permanent antistatic property even when added in a small amount, and an antistatic resin composition containing the antistatic agent.

2. Description of Related Art

Conventionally, as a method of imparting an antistatic property to a highly insulative thermoplastic resin, a method of kneading a small amount of surfactant into the thermoplastic resin is common. However, in a case that the antistatic property of the molded article formed by a resin composition is obtained through the addition of surfactant, an effect emerges by a low molecular weight surfactant bleeding out on a surface of the molded article. Accordingly, the antistatic effect of the molded article would be lost due to water washing, wiping and the like, and it was difficult to maintain a permanent antistatic property.

As other methods of imparting a permanent antistatic property to the thermoplastic resin, (1) a method of kneading an electrically conductive filler such as carbon black thereinto, and (2) a method of kneading a high molecular antistatic agent thereinto, and the like are known. Nevertheless, in the method (1), a large amount of electrically conductive filler is generally required to develop the antistatic effect; furthermore, there were problems that an obtained resin composition fails to achieve good workability and that a molded article formed by the resin composition is inferior in mechanical strength such as impact resistance.

In addition, the method (2) is known as a method of kneading a relatively smaller amount of high molecular antistatic agent such as polyetheresteramide (see Patent literature 1, for example) and polyether/polyolefin block polymer (see Patent literature 2, for example) into the resin. Nevertheless, in the method of kneading a high molecular antistatic agent into the resin, it is necessary to add more than 10 wt % of the high molecular antistatic agent to provide the thermoplastic resin with a sufficient antistatic property, and there was a problem of physical properties such as mechanical strength, thermal resistance, etc. of the molded article being lowered. Furthermore, from an economic point of view, it is preferred that the antistatic agent be able to impart a permanent antistatic property in an amount less than that conventionally.

REFERENCES LIST

Patent Literature

Patent literature 1: Japanese Patent Publication no. H08-12755
Patent literature 2: Japanese Patent Publication no. 2001-278985

SUMMARY OF THE INVENTION

Technical Problems to Be Solved by the Invention

The object of the invention is to provide an antistatic agent which does not impair the appearance or mechanical strength of a molded article and provides the molded article with a sufficient permanent antistatic property even when added in a small amount, and an antistatic resin composition containing the same.

Technical Means for Solving the Technical Problems

In order to solve the above-mentioned problems, the inventors have carried out intensive research and have eventually accomplished the invention. That is, the invention is an antistatic agent (Z) including a block polymer (A) containing a block of hydrophobic polymer (a) and a block of hydrophilic polymer (b) as constituent units, and an organic fluorine-modified polyolefin (B); an antistatic resin composition containing the antistatic agent and a thermoplastic resin (C); a molded article formed by molding the composition; and a molded product formed by coating and/or printing the molded article.

Effects of the Invention

The antistatic agent and antistatic resin composition of the invention have the following effects.
(1) The antistatic agent of the invention is able to impart to the molded article an excellent permanent antistatic property even when added in a small amount.
(2) The molded article formed by molding the antistatic resin composition of the invention is excellent in appearance and mechanical strength.

DESCRIPTION OF THE EMBODIMENTS

The antistatic agent (Z) of the invention includes a block polymer (A) containing a block of hydrophobic polymer (a) and a block of hydrophilic polymer (b) as constituent units, and an organic fluorine-modified polyolefin (B).

[Hydrophobic Polymer (a)]

The hydrophobic polymer (a) in the invention refers to a polymer having a volume intrinsic resistance of more than $1 \times 10^{11}$ Ω·cm. Specifically, there may be mentioned a polyamide (a1), a polyolefin (a2), a polyamide-imide (a3), and the like, and two or more thereof may also be employed in combination. Among (a), in view of antistatic property, the polyamide (a1) and the polyolefin (a2) are preferred.

In addition, the volume intrinsic resistance in the invention is a value measured in an atmosphere of 23° C. and 50% RH according to ASTM D257 (1984).

As the polyamide (a1), there may be mentioned one obtained by ring-opening polymerizing or polycondensating an amide-forming monomer (α), a polycondensate of a diamine (β) and a dicarboxylic acid (γ), and the like.

As the amide-forming monomer (α), there may be mentioned a lactam (α1-1), an aminocarboxylic acid (α1-2), and the like.

As the lactam (α1-1), there may be mentioned a C4-20 lactam (caprolactam, enantholactam, laurolactam, undecanolactam, etc.) and the like.

As the aminocarboxylic acid (α1-2), there may be mentioned a C2-20 aminocarboxylic acid (ω-aminocaproic acid, ω-aminoenanthic acid, ω-aminocaprylic acid, ω-aminopelargonic acid, ω-aminocapric acid, 11-aminoundecanoic acid, 12-aminododecanoic acid, a mixture thereof, etc.) and the like.

As the diamine (β), there may be mentioned a C2-20 aliphatic diamine (ethylenediamine, propylenediamine, hexamethylenediamine, decamethylenediamine, 1,12-dodecanediamine, 1,18-octadecanediamine, 1,20-eicosanediamine, etc.), a C5-20 alicyclic diamine [1,3- or 1,4-cyclohexanediamine, isophoronediamine. 4,4'-diaminocyclohexylmethane, 2,2-bis(4-aminocyclohexyl)propane, etc.], a C6-20 aromatic diamine [p-phenylenediamine, 2,4- or 2,6-toluoylenediamine, 2,2-bis(4,4'-diaminophenyl)propane, p- or m-xylylenediamine, bis(aminoethyl)benzene, bis(aminopropyl)benzene, bis(aminobutyl)benzene, etc.], and the like.

As the dicarboxylic acid (γ), there may be mentioned a C2-20 aliphatic dicarboxylic acid (succinic acid, glutaric acid, adipic acid, pimelic acid, suberic acid, azelaic acid, sebacic acid, undecanedioic acid, dodecanedioic acid, maleic acid, fumaric acid, itaconic acid, etc.), a C8-20 aromatic dicarboxylic acid (phthalic acid, 2,6- or 2,7-naphthalenedicarboxylic acid, diphenyl-4,4'-dicarboxylic acid, diphenoxyethanedicarboxylic acid, tolylenedicarboxylic acid, xylylenedicarboxylic acid, alkali metal salt of 5-sulfoisophthalic acid, etc.), a C5-20 alicyclic dicarboxylic acid (cyclopropanedicarboxylic acid, 1,4-cyclohexanedicarboxylic acid, cyclohexenedicarboxylic acid, dicyclohexyl-4,4'-dicarboxylic acid, camphoric acid, etc.), and the like.

As specific examples of the polyamide (a1), there may be mentioned nylon 6,6, nylon 6,9, nylon 6,12, nylon 6, nylon 11, nylon 12, nylon 4,6, a copolymer of nylon 6 and nylon 6,6, a copolymer of nylon 6 and nylon 12, a copolymer of nylon 6, nylon 6,6 and nylon 12, and the like.

As the polyolefin (a2), there may be mentioned a polyolefin (a2-1) having a carboxyl group at two terminals of a polymer, a polyolefin (a2-2) having a hydroxyl group at two terminals of a polymer, a polyolefin (a2-3) having an amino group at two terminals of a polymer, a polyolefin (a2-4) having an isocyanate group at two terminals of a polymer, a polyolefin (a2-5) having a carboxyl group at one terminal of a polymer, a polyolefin (a2-6) having a hydroxyl group at one terminal of a polymer, a polyolefin (a2-7) having an amino group at one terminal of a polymer, a polyolefin (a2-8) having an isocyanate group at one terminal of a polymer, and the like. Among these, the polyolefins (a2-1) and (a2-5) having a carboxyl group at end(s) are preferred. In addition, the "terminal" in the invention refers to a terminal part at which a repeated structure of a monomer unit constituting a polymer is broken. Moreover, the "two terminals" refer to the two terminals of the main chain of a polymer, and the "one terminal" refers to either terminal of the main chain of a polymer.

As (a2-1), there may be used one obtained by introducing a carboxyl group at two terminals of a polyolefin (a2-01) that contains a polyolefin having two modifiable terminals as a main component (the content thereof is preferably 50 wt % or more, more preferably 75 wt % or more, and especially preferably 80-100 wt %); as (a2-2), there may be used one obtained by introducing a hydroxyl group at two terminals of (a2-01); as (a2-3), there may be used one obtained by introducing an amino group at two terminals of (a2-01); and as (a2-4), there may be used one obtained by introducing an isocyanate group at two terminals of (a2-01).

As (a2-5)-(a2-8), there may be used ones obtained by introducing respectively a carboxyl group, a hydroxyl group, an amino group or an isocyanate group at one terminal of a polyolefin (a2-02) that replaces the polyolefin (a2-01) and contains a polyolefin having one modifiable terminal as a main component (the content thereof is preferably 50 wt % or more, more preferably 75 wt % or more, and especially preferably 80-100 wt %).

The polyolefin (a2-01) that contains a polyolefin having two modifiable terminals as a main component includes a polyolefin obtained through (co)polymerization (i.e. polymerization or copolymerization; the same below) of a mixture of one or two or more C2-30 (preferably C2-12, and more preferably C2-10) olefins (polymerization method) and a degraded polyolefin {obtained by mechanically, thermally, or chemically degrading a high molecular weight polyolefin [preferably having a number average molecular weight (hereinafter referred to as Mn) of 50,000-150,000] (degradation method)}.

Among these, in view of ease of modification by introducing carboxyl group, hydroxyl group, amino group, or isocyanate group, and of ease of availability, a degraded polyolefin and especially a thermally degraded polyolefin is preferred. According to the thermal degradation, as described below, a low molecular weight polyolefin having an average number of terminal double bonds of 1.5-2 per molecule is easily obtained, and the low molecular weight polyolefin is easily modified by introducing carboxyl group, hydroxyl group, amino group, isocyanate group, and the like.

Mn of the polymer in the invention may be measured by gel permeation chromatography (GPC) under the following conditions.

Apparatus (in one embodiment): "HLC-8120" [manufactured by TOSOH CORPORATION]
Column (in one embodiment): "TSKgelGMHXL" (two) "TSKgelMultiporeHXL-M" (one)
Sample solution: 0.3 wt % o-dichlorobenzene solution
Injection volume of solution: 100 μl
Flow rate: 1 ml/min
Measurement temperature: 135° C.
Detector: refractive index detector
Reference material: standard polystyrene (TSKstandardPOLYSTYRENE) 12 points (molecular weight: 500, 1,050, 2,800, 5,970, 9,100, 18,100, 37,900, 96,400, 190,000, 355,000, 1,090,000 and 2,890,000) [manufactured by TOSOH CORPORATION]

As the thermally degraded polyolefin, though not particularly limited, there may be mentioned one obtained by heating a high molecular weight polyolefin (at 300-450° C. for 0.5-10 hours through, for example, one obtained by the method described in Japanese Patent Publication no. H03-62804), one obtained by thermally degrading a high molecular weight polyolefin by heating it in the air, and the like.

As the high molecular weight polyolefin used in the thermal degradation method, there may be mentioned a (co)polymer of a mixture of one or two or more C2-30 (preferably C2-12, and more preferably C2-10) olefins [Mn is preferably 12,000-100,000, and more preferably 15,000-17,000. The melt flow rate (hereinafter referred to as MFR and expressed in unit of g/10 min) is preferably 0.5-150, and more preferably 1-100] and the like. Here, MFR is a value to represent a melt viscosity of a resin. The greater the value, the lower the melt viscosity. MFR is measured using an extrusion-type plastometer as specified in JIS K6760 and is determined according to JIS K7210 (1976). For example, the conditions for polypropylene are 230° C. under a load of 2.16 kgf.

As the C2-30 olefin, there may be mentioned a C2-30 α-olefin and a C4-30 diene.

As the C2-30 α-olefin, there may be mentioned ethylene, propylene, 1-butene, 4-methyl-1-pentene, 1-pentene, 1-octene, 1-decene, 1-dodecene, 1-eicosene, 1-tetracosene, and the like. As the C4-30 diene, there may be mentioned butadiene, isoprene, cyclopentadiene, 1,11-dodecadiene, and the like.

Among the C2-30 olefin, in view of molecular weight control, ethylene, propylene, C4-12 α-olefin, butadiene, isoprene and a mixture thereof are preferred, ethylene, propylene, C4-10 α-olefin, butadiene and a mixture thereof are more preferred, ethylene, propylene, butadiene and a mixture thereof are especially preferred.

In view of antistatic property of the later described molded article, Mn of the polyolefin (a2-01) is preferably 800-20,000, and more preferably 1,000-10,000, and especially preferably 1,200-6,000.

In view of antistatic property of the molded article, the number of terminal double bonds per 1,000 carbons in (a2-01) is preferably 1-40, more preferably 2-30, and especially preferably 4-20.

In view of ease of obtaining a repeated structure in a molecule, antistatic property of the molded article and thermoplasticity of the later described block polymer (A), the average number of terminal double bonds per molecule in (a2-01) is preferably 1.1-5, more preferably 1.3-3, especially preferably 1.5-2.5, and most preferably 1.8-2.2.

When adopting the method of obtaining the low molecular weight polyolefin through the thermal degradation method, (a2-01) having an Mn in the range of 800-6,000 and having an average number of 1.5-2 terminal double bonds per molecule is easily obtained [Katsuhide Murada and Tadahiko Makino, Journal of the Chemical Society of Japan, page 192 (1975)].

The polyolefin (a2-02) that contains a polyolefin having one modifiable terminal as a main component may be obtained in the same way as that for (a2-01). In view of antistatic property of the later described molded article, Mn of (a2-02) is preferably 2,000-50,000, more preferably 2,500-30,000, and especially preferably 3,000-20,000.

In view of antistatic property of the molded article and of molecular weight control of the block polymer (A), the number of double bonds per 1,000 carbons in (a2-02) is preferably 0.3-20, more preferably 0.5-15, and especially preferably 0.7-10.

In view of ease of obtaining a repeated structure in a molecule, antistatic property of the molded article and thermoplasticity of the later described block polymer (A), the average number of double bonds per molecule in (a2-02) is preferably 0.5-1.4, more preferably 0.6-1.3, especially preferably 0.7-1.2, and most preferably 0.8-1.1.

Among (a2-02), in view of ease of modification, a low molecular weight polyolefin obtained through the mal degradation method is preferred, and polyethylene and/or polypropylene obtained through the thermal degradation method and having an Mn of 3,000-20,000 is more preferred.

When adopting the method of obtaining the low molecular weight polyolefin through the thermal degradation method, a polyolefin having an Mn in the range of 6,000-30,000, and having an average number of terminal double bonds of 1-1.5 per molecule in (a2-02) is obtained.

The low molecular weight polyolefin obtained through the thermal degradation method has the average number of terminal double bonds, and therefore, is easy to modify by introducing carboxyl group, hydroxyl group, amino group, isocyanate group, and the like.

In addition, (a2-01) and (a2-02) are generally obtained as a mixture thereof, and the mixture may be employed directly, or employed after purification. In view of production cost, the mixture is preferred.

Hereinafter, (a2-1)-(a2-4) having a carboxyl group, a hydroxyl group, an amino group or an isocyanate group at two terminals of the polyolefin (a2-01) are described. (a2-5)-(a2-8) having these groups at one terminal of the polyolefin (a2-02) may be similarly obtained as described for (a2-1)-(a2-4) by replacing (a2-01) with (a2-02).

As the polyolefin (a2-1) having a carboxyl group at two terminals of a polymer, there may be employed a polyolefin (a2-1-1) having a structure obtained through modification of the terminals of (a2-01) with an α,β-unsaturated carboxylic acid (anhydride) (i.e. α,β-carboxylic acid, alkyl (C1-4) ester thereof or anhydride thereof; the same below), a polyolefin (a2-1-2) having a structure obtained through secondary modification of (a2-1-1) with a lactam or an aminocarboxylic acid, a polyolefin (a2-1-3) having a structure obtained through modification of (a2-01) through oxidization or hydroformylation, a polyolefin (a2-1-4) having a structure obtained through secondary modification of (a2-1-3) with a lactam or an aminocarboxylic acid, a mixture of two or more thereof, and the like.

(a2-1-1) may be obtained through modification of (a2-01) with an α,β-unsaturated carboxylic acid (anhydride).

As the α,β-unsaturated carboxylic acid (anhydride) for modification, there may be mentioned a monocarboxylic acid, a dicarboxylic acid, an alkyl (C1-4) ester of mono- or di-carboxylic acid, and an anhydride of mono- or di-carboxylic acid, specifically, there may be mentioned (meth)acrylic acid (i.e. acrylic acid or methacrylic acid; the same below), methyl (meth)acrylate, butyl (meth)acrylate, maleic acid (anhydride), dimethyl maleate, fumaric acid, itaconic acid (anhydride), diethyl itaconate, citraconic acid (anhydride), and the like.

Among these, in view of ease of modification, dicarboxylic acid, alkyl ester of mono- or di-carboxylic acid and anhydride of mono- or di-carboxylic acid are preferred, maleic acid (anhydride) and fumaric acid are more preferred, and maleic acid (anhydride) is especially preferred.

In view of ease of obtaining a repeated structure in a molecule, antistatic property of the molded article and dispersivity of the block polymer (A) in the later described antistatic resin composition, the content of the α,β-unsaturated carboxylic acid (anhydride) for modification is preferably 0.5-40 wt %, more preferably 1-30 wt %, and especially preferably 2-20 wt %, based on the weight of the polyolefin (a2-01).

The modification by means of the α,β-unsaturated carboxylic acid (anhydride) may be carried out by, for example, subjecting a terminal double bond of (a2-01) to an addition reaction (ene reaction) of the α,β-unsaturated carboxylic acid (anhydride) through a solvent method or a melting method, wherein the reaction temperature is preferably 170-230° C.

(a2-1-1) may be obtained through secondary modification of (a2-1) with a lactam or an aminocarboxylic acid.

As the lactam for secondary modification, there may be mentioned a C6-12 (preferably C6-8, and more preferably C6) lactam and the like, specifically, there may be mentioned caprolactam, enantholactam, laurolactam, undecanolactam, and the like.

As the aminocarboxylic acid, there may be mentioned a C2-12 (preferably C4-12, and more preferably C6-12) aminocarboxylic acid and the like, specifically, there may be mentioned amino acid (glycine, alanine, valine, leucine, isoleucine, phenylalanine, etc.), ω-aminocaproic acid, ω-aminoenanthic acid, ω-aminocaprylic acid, ω-aminopergonic acid, ω-aminocapric acid, 11-aminoundecanoic acid, 12-aminododecanoic acid, and the like.

Among the lactams and aminocarboxylic acids, caprolactam, laurolactam, glycine, leucine, ω-aminocaprylic acid, 11-aminoundecanoic acid, and 12-aminododecanoic acid are preferred, caprolactam, laurolactam, ω-aminocaprylic acid, 11-aminoundecanoic acid, and 12-aminododecanoic acid are more preferred, caprolactam and 12-aminododecanoic acid are especially preferred.

In view of ease of obtaining a repeated structure in a molecule, antistatic property of the molded article and thermoplasticity of the block polymer (A), the amount of the lactam or aminocarboxylic acid used for secondary modification is preferably 0.5-200 wt %, more preferably 1-150 wt %, and especially preferably 2-100 wt %, based on the weight of the modified article (a2-1).

(a2-3) may be obtained by introducing a carboxyl group into (a2-01) through an oxidating method (oxidation method) by means of oxygen and/or ozone or through hydroformylation by an oxo process.

The introduction of carboxyl group through an oxidation method may be carried out by a well-known method, for example, the method described in the specification of U.S. Pat. No. 3,692,877. The introduction of carboxyl group through hydroformylation may be carried out by various methods including well-known methods, for example, the method described in Macromolecules, vol. 31, page 5943.

(a2-4) may be obtained through secondary modification of (a2-3) with a lactam or an aminocarboxylic acid.

As the lactam and aminocarboxylic acid, there may be mentioned the same as those illustrated as the lactam and aminocarboxylic acid used for secondary modification of (a2-1), and the preferred range and the amount employed are also the same.

In view of thermal resistance and of reactivity with the later described hydrophilic polymer (b), Mn of (a2-1) is preferably 800-25,000, more preferably 1,000-20,000, and especially preferably 2,500-10,000.

Moreover, in view of reactivity with (b) and thermoplasticity of the block polymer (A), an acid value of (a2-1) is preferably 4-280 mgKOH/g, more preferably 4-100 mgKOH/g, and especially preferably 5-50 mgKOH/g.

As the polyolefin (a2-2) having a hydroxyl group at two terminals of a polymer, there may be employed a polyolefin having a hydroxyl group obtained through modification of the polyolefin (a2-1) that has a carboxyl group at two terminals of a polymer with a hydroxyl group-containing amine, and a mixture of two or more thereof.

As the hydroxyl group-containing amine usable for modification, there may be mentioned a C2-10 hydroxyl group-containing amine, specifically, there may be mentioned 2-aminoethanol, 3-aminopropanol, 1-amino-2-propanol, 4-aminobutanol, 5-aminopentanol, 6-aminohexanol, 3-aminomethyl-3,5,5-trimethylcyclohexanol, and the like.

Among these, in view of ease of modification, C2-6 hydroxyl group-containing amines (2-aminoethanol, 3-aminopropanol, 4-aminobutanol, 5-aminopentanol, 6-aminohexanol, etc.) are preferred, 2-aminoethanol and 4-aminobutanol are more preferred, and 2-aminoethanol is especially preferred.

In view of ease of obtaining a repeated structure in a molecule, antistatic property of the molded article, dispersivity of the block polymer (A) in the later described antistatic resin composition, and mechanical property of the molded article, the amount of the hydroxyl group-containing amine for modification is preferably 0.5-50 wt %, more preferably 1-40 wt %, and especially preferably 2-30 wt %, based on the weight of the modified article (a2-1).

In view of thermal resistance and of reactivity with the later described hydrophilic polymer (b), Mn of (a2-2) is preferably 800-25,000, more preferably 1,000-20,000, and especially preferably 2,500-10,000.

In view of reactivity with (b) and thermoplasticity of the block polymer (A), a hydroxyl value of (a2-2) is preferably 4-280 mgKOH/g, more preferably 4-100 mgKOH/g, and especially preferably 5-50 mgKOH/g.

As the polyolefin (a2-3) having an amino group at two terminals of a polymer, there may be employed a polyolefin having an amino group obtained through modification of the polyolefin (a2-1) that has a carboxyl group at two terminals of a polymer with a diamine (Q1), and a mixture of two or more thereof.

As the diamine (Q1), there may be employed a C2-12 diamine, specifically, there may be mentioned ethylenediamine, hexamethylenediamine, heptamethylenediamine, octamethylenediamine, decamethylenediamine, and the like.

Among these, in view of ease of modification, C2-8 diamines (ethylenediamine, hexamethylenediamine, heptamethylenediamine, octamethylenediamine, etc.) are preferred, ethylenediamine and hexamethylenediamine are more preferred, and ethylenediamine is especially preferred.

In view of ease of obtaining a repeated structure in a molecule, antistatic property of the molded article, dispersivity of the block polymer (A) in the antistatic resin composition, and mechanical property of the molded article, the amount of (Q1) for the modification of (a2-1) is preferably 0.5-50 wt %, more preferably 1-40 wt %, and especially preferably 2-30 wt %, based on the weight of (a2-1). In addition, from the point of view of preventing polyamidation (polyimidation), the modification of (a2-1) by means of (Q1) is preferably a method of removing un-reacted (Q1) under a reduced pressure at 120° C.-230° C. after using (Q1) preferably at 0.5-1,000 wt %, more preferably at 1-500 wt %, and especially preferably at 2-300 wt %, based on the weight of (a2-1).

In view of thermal resistance and of reactivity with the later described hydrophilic polymer (b), Mn of (a2-3) is preferably 800-25,000, more preferably 1,000-20,000, and especially preferably 2,500-10,000.

In view of reactivity with (b) and thermoplasticity of the block polymer (A), an amine value of (a2-3) is preferably 4-280 mgKOH/g, more preferably 4-100 mgKOH/g, and especially preferably 5-50 mgKOH/g.

As the polyolefin (a2-4) having an isocyanate group at two terminals, there may be mentioned a polyolefin having an isocyanate group obtained through modification of (a2-2) with poly(2-3 or more)isocyanate (hereinafter referred to as PI), and a mixture of two or more thereof.

As PI, there may be mentioned a C (excluding C in an NCO group; the same below) 6-20 aromatic PI, a C2-18 aliphatic PI, a C4-15 alicyclic PI, a C8-15 aralipathic PI, and a modified product and a mixture of two or more of these PI.

As the aromatic PI, there may be mentioned 1,3- or 1,4-phenylene diisocyanate, 2,4- or 2,6-tolylene tolylene diisocyanate (TDI), crude TDI, 2,4'- or 4,4'-diphenylmethane (MDI), 4,4'-diisocyanatobiphenyl, 3,3'-dimethyl-4,4'-diisocyanatobiphenyl, 3,3'-dimethyl-4,4'-diisocyanatodiphenylmethane, 1,5-naphthylene diisocyanate, and the like.

As the aliphatic PI, there may be mentioned ethylene diisocyanate, tetramethylene diisocyanate, hexamethylene diisocyanate (HDI), dodecamethylene diisocyanate, 2,2,4-trimethylhexamethylene diisocyanate, lysine diisocyanate, 2,6-diisocyanatomethyl caproate, bis(2-isocyanatoethyl)

fumarate, bis(2-isocyanatoethyl) carbonate, 2-isocyanatoethyl-2,6-diisocyanatohexanoate, and the like.

As the alicyclic PI, there may be mentioned isophorone diisocyanate (IPDI), dicyclohexylmethane-4,4'-diisocyanate (hydrogenated MDI), cyclohexylene diisocyanate, methylcyclohexylene diisocyanate (hydrogenated TDI), bis(2-isocyanatoethyl)-4-cyclohexene-1,2-dicarboxylate, 2,5- or 2,6-norbormane diisocyanate, and the like.

As the araliphatic PI, there may be mentioned m- or p-xylylene diisocyanate (XDI), α,α,α',α'-tetramethylxylylene diisocyanate (TMXDI), and the like.

As the modified product of the PI, there may be mentioned a urethane modified product, a urea modified product, a carbodiimide modified product, an uretdione modified product, and the like.

Among the PI, TDI, MDI, and HDI are preferred, and HDI is more preferred.

The reaction between PI and (a2-2) may be carried out by the same method as that for general urethane reaction.

A molar equivalent ratio (NCO/OH) of PI to (a2-2) is preferably 1.8/1-3/1, and preferably 2/1.

In order to facilitate the urethane reaction, a catalyst generally used for the urethane reaction may be employed as needed. As the catalyst, there may be mentioned a metal catalyst {tin catalyst [dibutyltin dilaurate, stannous octoate, etc.], lead catalyst [lead 2-ethylhexanoate, lead octenoate, etc.], other metal catalysts [metal naphthenate (cobalt naphthenate, etc.), phenylmercury propionate, etc.]}; an amine catalyst {triethylenediamine, diazabicycloalkene[1,8-diazabicyclo[5,4,0]undecene-7, etc.], dialkylaminoalkylamine [dimethylaminoethylamine, dimethylaminooctylamine, etc.], a carbonate salt or an organic acid (formic acid, etc.) salt of a heterocyclic aminoalkylamine [2-(1-aziridinyl)ethylamine, 4-(1-piperidinyl)-2-hexylamine, etc.], N-methyl or N-ethyl morpholine, triethylamine, diethyl- or dimethylethanolamine; and a combination of two or more thereof.

Based on the total weight of PI and (a2-2), the amount of the catalyst employed is preferably 3% or less, and more preferably 0.001-2 wt %.

In view of thermal resistance and of reactivity with the later described hydrophilic polymer (b), Mn of (a2-4) is preferably 800-25,000, more preferably 1,000-20,000, and especially preferably 2,500-10,000.

As the polyamide-imide (a3), polymers that contain the amide-forming monomer (α) and a trivalent or tetravalent aromatic polycarboxylic acid obtained by forming (α) and at least one imide ring, or an anhydride (δ) thereof as constituent monomers, and a mixture thereof may be included.

As (δ), there may be mentioned a trivalent carboxylic acid [a monocyclic trivalent carboxylic acid (trimellitic acid, etc.), a polycyclic trivalent carboxylic acid (1,2,5- or 2,6,7-naphthalenetricarboxylic acid, 3,3',4-biphenyltricarboxylic acid, benzophenone-3,3',4-tricarboxylic acid, diphenylsulfone-3,3',4-tricarboxylic acid, diphenylether-3,3',4-tricarboxylic acid, etc.), and an anhydride thereof], or a tetravalent carboxylic acid [a monocyclic tetravalent carboxylic acid (pyromellitic acid, etc.), a polycyclic tetravalent carboxylic acid (biphenyl-2,2',3,3'-tetracarboxylic acid, benzophenone-2,2',3,3'-tetracarboxylic acid, diphenylsulfone-2,2',3,3'-tetracarboxylic acid, diphenylether-2,2',3,3'-tetracarboxylic acid, etc.), and an anhydride thereof].

As a preparing method of the polyamide-imide (a3), there may be mentioned a method of employing one or two or more of the diamine (β) and the dicarboxylic acid (γ) as a molecular weight adjusting agent, and with such presence, a method of subjecting the amide-imide forming monomer to ring-opening polymerization or polycondensation, similar to that in the case of the polyamide (a1).

In view of antistatic property and of thermal resistance of the molded article, the amount of the molecular weight adjusting agent is preferably 2-80 wt %, and more preferably 4-75 wt %, based on the total weight of the amide-imide forming monomer and the molecular weight adjusting agent.

In view of moldability and of preparation of the antistatic agent, Mn of (a3) is preferably 200-5,000, and more preferably 500-4,000.

In view of dispersivity of the block polymer (A) and mechanical property of the molded article, Mn of the hydrophobic polymer (a) is preferably 200-5,000, more preferably 500-20,000, and especially preferably 1,000-15,000.

[Hydrophilic Polymer (b)]

The hydrophilic polymer (b) in the invention refers to a polymer having a volume intrinsic resistance of $1 \times 10^5$-$1 \times 10^{11}$ Ω·cm.

The volume intrinsic resistance of (b) is preferably $1 \times 10^6$-$1 \times 10^9$ Ω·cm, and more preferably $1 \times 10^6$-$1 \times 10^8$ Ω·cm. The one having a volume intrinsic resistance of less than $1 \times 10^5$ Ω·cm is substantially difficult to obtain. When the volume intrinsic resistance exceeds $1 \times 10^{11}$ Ω·cm, antistatic property of the later described molded article will be reduced.

As the hydrophilic polymer (b), there may be mentioned the hydrophilic polymer (b) described in Japanese Patent Gazette no. 3488163, specifically, there may be mentioned a polyether (b1), a polyether-containing hydrophilic polymer (b2), a cationic polymer (b3), an anionic polymer (b4), and the like.

As the polyether (b1), there may be mentioned a polyether diol (b1-1), a polyether diamine (b1-2), a modified product thereof (b1-3), and the like.

As the polyether diol (b1-1), there may be mentioned one obtained by subjecting a diol (b0) to an addition reaction of an alkylene oxide (hereinafter referred to as AO), and specifically, there may be mentioned one represented by a general formula (1).

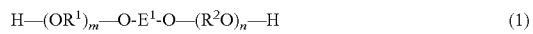

$$\text{H}—(\text{OR}^1)_m—\text{O-E}^1\text{-O}—(\text{R}^2\text{O})_n—\text{H} \quad\quad (1)$$

In the general formula (1), $E^1$ represents a residue obtained by removing all hydroxyl groups from the diol (b0).

As the diol (b0), there may be mentioned a C2-12 aliphatic divalent alcohol, a C5-12 alicyclic divalent alcohol, a C6-18 aromatic divalent alcohol, a tertiary amino group-containing diol, and the like.

As the C2-12 aliphatic divalent alcohol, there may be mentioned ethylene glycol (hereinafter referred to as EG), 1,2-propylene glycol (hereinafter referred to as PG), 1,4-butanediol, (hereinafter referred to as 1,4-BD) 1,6-hexanediol (hereinafter referred to as 1,6-HD), neopentyl glycol (hereinafter referred to as NPG), 1,12-dodecanediol, and the like.

As the C5-12 alicyclic divalent alcohol, there may be mentioned 1,4-di(hydroxymethyl)cyclohexane, 1,5-di(hydroxymethyl)cycloheptane, and the like.

As the C6-18 aromatic divalent alcohol, there may be mentioned a monocyclic aromatic divalent alcohol (xylylenediol, hydroquinone, catechol, resorcin, urushiol, bisphenol A, bisphenol F, bisphenol S, 4,4'-dihydroxybiphenyl-2,2-butane, dihydroxybiphenyl, etc.), a polycylic aromatic divalent alcohol (dihydroxynaphthalene, binaphthol, etc.), and the like.

As the tertiary amino group-containing diol, there may be mentioned a bishydroxyalkylate of a C1-12 aliphatic or alicyclic primary amine (methylamine, ethylamine, cyclopropylamine, 1-propylamine, 2-propylamine, pentylamine, isopentylamine, cyclopentylamine, hexylamine, cyclohexylamine, heptylamine, nonylamine, decylamine, undecylamine, dodecylamine, etc.), a bishydroxyalkylate of a C6-12 aromatic primary amine (aniline, benzyl amine, etc.), and the like.

Among these, in view of reactivity with a bishydroxyalkylate, a C2-12 aliphatic divalent alcohol and a C6-18 aromatic divalent alcohol are preferred, and EG and bisphenol A are more preferred.

In the general formula (1), $R^1$ and $R^2$ each represent independently a C2-4 alkylene group. As the C2-4 alkylene group, there may be mentioned an ethylene group, 1,2- or 1,3-propylene group, 1,2-, 1,3-, 1,4- or 2,3-butylene group, and the like.

In the general formula (1), m and n each represent independently a number from 1 to 300, preferably from 2 to 250, and more preferably from 10 to 100.

In the general formula (1), in the event m and n each represent 2 or more, $R^1$ and $R^2$ may be the same or different, and the part of $(OR^1)_m$ and $(R^2O)_n$ may be a random bond or a block bond.

The polyether diol (b1-1) may be prepared by subjecting the diol (b0) to an addition reaction of AO.

As AO, there may be used a C2-4 AO [ethylene oxide (hereinafter referred to as EO), 1,2- or 1,3-propylene oxide (hereinafter referred to as PO), 1,2-, 1,3-, 1,4-, or 2,3-butylene oxide (hereinafter referred to as BO)] and a combination of two or more thereof, and the same may also be used in combination with a small proportion (30 wt % or less based on the total weight of the AOs) of other AOs [C5-12 α-olefin oxide, styrene oxide, epihalohydrin (epichlorohydrin, etc.), etc.] as needed.

When two or more AOs are employed in combination, a bonding thereof may be in a form of random bonding or block bonding. As AO, EO alone and a combination of EO and other AOs are preferred.

The addition reaction of AO may be carried out by a well-known method, for example, at a temperature of 100-200° C. in the presence of an alkali catalyst.

Based on the weight of the polyether diol (b1-1) represented by the general formula (1), the content of $(OR^1)_m$ and $(R^2O)_n$ is preferably 5-99.8 wt %, more preferably 8-99.6 wt %, and especially preferably 10-98 wt %.

Based on the weight of $(OR^1)_m$ and $(R^2O)_n$ in the general formula (1), the content of oxyethylene group is preferably 5-100 wt %, more preferably 10-100 wt %, especially preferably 50-100 wt %, and most preferably 60-100 wt %.

As the polyether diamine (b1-2), there may be mentioned one represented by a general formula (2).

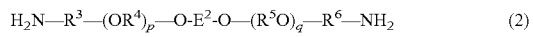

$$H_2N-R^3-(OR^4)_p-O-E^2-O-(R^5O)_q-R^6-NH_2 \quad (2)$$

In the general formula (2), $E^2$ represents a residue obtained by removing all hydroxyl groups from the diol (b0). As the diol (b0), there may be mentioned the same ones as the above and the preferred range thereof is also the same.

In the general formula (2), $R^3$, $R^4$, $R^5$ and $R^6$ each represent independently a C2-4 alkylene group. As the C2-4 alkylene group, there may be mentioned the same ones as those illustrated above as $R^1$ and $R^2$ in the general formula (1), and the preferred range thereof is also the same.

In the general formula (2), p and q each represent independently a number from 1 to 300, preferably from 2 to 250, and more preferably from 10 to 100.

In the general formula (2), in the event p and q each represent 2 or more, $R^4$ and $R^5$ may be the same or different, and the part of $(OR^4)_p$ and $(R^5O)_q$ may be a random bond or a block bond.

The polyether diamine (b1-2) may be prepared by converting all hydroxyl groups contained in the polyether diol (b1-1) into amino groups. For example, the polyether diamine (b1-2) may be prepared by reacting the polyether diol (b1-1) with acrylonitrile and then hydrogenating an obtained cyanoethylate.

As the modified product (b1-3), there may be mentioned an aminocarboxylic acid modified product (with a terminal amino group) of (b1-1) or (b1-2), an isocyanate modified product (with a terminal isocyanate group) of (b1-1) or (b1-2), an epoxy modified product (with a terminal epoxy group) of (b1-1) or (b1-2), and the like.

The aminocarboxylic acid modified product may be obtained by reacting (b1-1) or (b1-2) with an aminocarboxylic acid or a lactam.

The isocyanate modified product may be obtained by reacting (b1-1) or (b1-2) with a polyisocyanate, or by reacting (b1-2) with phosgene.

The epoxy modified product may be obtained by reacting (b1-1) or (b1-2) with a diepoxide (an epoxy resin such as diglycidyl ether, diglycidyl ester, alicyclic diepoxide, or the like with an epoxy equivalent of 85-600), or by reacting (b1-1) with epihalohydrin (epichlorohydrin, etc.).

In view of thermal resistance and of reactivity with the hydrophobic polymer (a), Mn of the polyether (b1) is preferably 150-20,000, more preferably 300-18,000, especially preferably 1,000-15,000, and most preferably 1,200-8,000.

As the polyether-containing hydrophilic polymer (b2), there may be mentioned a polyetheresteramide (b2-1) having a segment of a polyether diol (b1-1), a polyether amide imide (b2-2) having a segment of (b1-1), a polyether ester (b2-3) having a segment of (b1-1), a polyether amide (b2-4) having a segment of the polyether diamine (b1-2), a polyether urethane (b2-5) having a segment of (b1-1) or (b1-2), and the like.

The polyetheresteramide (b2-1) is constituted by, a polyamide (a1') among the polyamides (a1) that has a carboxyl group at two terminals, and the polyether diol (b1-1).

As (a1'), there may be mentioned a ring-opened polymer of the lactam (a1-1), a polycondensate of the aminocarboxylic acid (a1-2), a polyamide of the diamine (β) and the dicarboxylic acid (γ), and the like.

Among (a1'), in view of antistatic property, a ring-opened polymer of caprolactam, a polycondensate of 12-aminododecanoic acid, and a polyamide of adipic acid and hexamethylenediamine are preferred, and a ring-opened polymer of caprolactam is more preferred.

The polyether amide imide (b2-2) is constituted by a polyamide-imide (a3) having at least one imide ring, and the polyether diol (b1-1).

As (a3), there may be mentioned a polymer formed by the lactam (a1-1) and the trivalent or tetravalent aromatic carboxylic acid (6) obtained by forming at least one imide ring, a polymer formed by the aminocarboxylic acid (a1-2) and (6), a polymer of the polyamide (a1') and (6), and a mixture thereof.

As the polyether ester (b2-3), there may be mentioned one constituted by a polyester (Q) and the polyether diol (b1-1).

As (Q), there may be mentioned a polyester of the dicarboxylic acid (γ) and the diol (b0).

As the polyether amide (b2-4), there may be mentioned one constituted by the polyamide (a1) and the polyether diamine (a2-3).

The polyether urethane (b2-5) is constituted by a diisocyanate among the PI, the polyether diol (b1-1) or the polyether diamine (b1-2), and, as needed, a chain extension agent [the diol (b0), the diamine (β), etc.].

In view of moldability, the content of the polyether (b1) in the polyether-containing hydrophilic polymer (b2) is preferably 30-80 wt %, and more preferably 40-70 wt %, based on the weight of (b2).

In view of antistatic property and moldability, the content of oxyethylene group in (b2) is preferably 30-80 wt %, and more preferably 40-70 wt %, based on the weight of (b2).

In view of thermal resistance, a lower limit of Mn of (b2) is preferably 800, and more preferably 1,000. In view of reactivity with the hydrophobic polymer (a), an upper limit of Mn of (b2) is preferably 50,000, and more preferably 30,000.

As the cationic polymer (b3), there may be mentioned a polymer having cationic groups in a molecule that are spaced by a non-ionic molecular chain.

As the non-ionic molecular chain, there may be mentioned a divalent hydrocarbon group, a divalent hydrocarbon group having one or more groups selected from a group consisting of an ether bond, a thioether bond, a carbonyl bond, an ester bond, an imino bond, an amide bond, an imide bond, a urethane bond, a urea bond, a carbonate bond and a silyloxy bond, a hydrocarbon group having a heterocyclic structure having a nitrogen atom or an oxygen atom, and the like.

Among the non-ionic molecular chain, a divalent hydrocarbon group and a divalent hydrocarbon group having an ether bond are preferred.

As the cationic group, there may be mentioned a group having a quaternary ammonium salt or phosphonium salt. As counter anions that form the quaternary ammonium salt or phosphonium salt, there may be mentioned an anion of a superacid and other anions, and the like.

As the anion of a superacid, there may be mentioned an anion of a superacid (tetrafluoroboric acid, hexafluorophosphoric acid, etc.) derived from a combination of a protonic acid and a Lewis acid, an anion of a trifluoromethanesulfonic acid, and the like.

As other anions, there may be mentioned a halide ion ($F^-$, $Cl^-$, $Br^-$, $I^-$, etc.), $OH^-$, $PO_4^-$, $CH_3OSO_4^-$, $C_2H_5OSO_4^-$, $ClO_4^-$, and the like.

As the protonic acid from which the superacid is derived, there may be mentioned hydrogen fluoride, hydrogen chloride, hydrogen bromide, hydrogen iodide, and the like.

As the Lewis acid, there may be mentioned boron trifluoride, phosphorus pentafluoride, antimony pentafluoride, arsenic pentafluoride, tantalum pentafluoride, and the like.

The number of cationic groups in a molecule of (b3) is preferably 2-80, and more preferably 3-60.

As specific examples of (b3), there may be mentioned the cationic polymer described in Japanese Patent Publication no. 2001-278985.

In view of antistatic property and of reactivity with the hydrophobic polymer (a), Mn of (b3) is preferably 500-20,000, more preferably 1,000-15,000, and especially preferably 1,200-8,000.

The anionic polymer (b4) is a polymer containing a sulfonyl group-containing dicarboxylic acid (γ'), and the diol (b0) or the polyether (b1) as essential constituent units, and having 2-80 and preferably 3-60 sulfonyl groups in a molecule.

As (γ'), there may be mentioned one obtained by introducing a sulfonyl group into the dicarboxylic acid (γ), such as a sulfonyl group-containing aromatic dicarboxylic acid, a sulfonyl group-containing aliphatic dicarboxylic acid, a sulfonyl group-containing aromatic or aliphatic dicarboxylic acid in which only the sulfonyl group thereof is converted into a salt, and the like.

As the sulfonyl group-containing aromatic dicarboxylic acid, there may be mentioned a 5-sulfoisophthalic acid, a 2-sulfoisophthalic acid, a 4-sulfoisophthalic acid, a 4-sulfo-2,6-naphthalenedicarboxylic acid, and an ester forming derivative [alkyl (C1-4) ester (methyl ester, ethyl ester, etc.), anhydride, etc.] thereof.

As the sulfonyl group-containing aliphatic dicarboxylic acid, there may be mentioned sulfosuccinate and an ester forming derivative [alkyl (C1-4) ester (methyl ester, ethyl ester, etc.), anhydride, etc.] thereof.

As a salt formed by the sulfonyl group-containing aromatic or aliphatic dicarboxylic acid in which only the sulfonyl group thereof is converted into the salt, there may be mentioned an alkali metal (lithium, sodium, potassium, etc.) salt, an alkaline earth metal (magnesium, calcium, etc.) salt, an ammonium salt, an amine salt of a monoamine, diamine, triamine or the like having a hydroxylalkyl (C2-4) group (monoethylamine, diethylamine or triethylamine, monoethanol amine, diethanol amine or triethanol amine, diethylethanol amine, etc.), a quaternary ammonium salt of the above amines, and the like.

Among these, a sulfonyl group-containing aromatic dicarboxylic acid is preferred, a 5-sulfoisophthalic acid salt is more preferred, and a 5-sulfoisophthalic acid sodium salt and a 5-sulfoisophthalic acid potassium salt are especially preferred.

Among (b0) or (b1) constituting (b4), a C2-10 alkanediol, EG, polyethylene glycol (hereinafter referred to as PEG) (having a polymerization degree of 2-20), an EO adduct of a bisphenol (bisphenol A, etc.) (having an addition mole number of 2-60), and a mixture of two or more thereof are preferred.

As a preparing method of (b4), a general preparation method of polyester may be directly used. Polyesterification is generally carried out at a temperature ranging from 150 to 240° C. under a reduced pressure, and the reaction time is preferably 0.5-20 hours. Moreover, a catalyst used for general esterification reaction may be employed as needed. As the catalyst for esterification, there may be mentioned an antimony catalyst (antimony trioxide, etc.), a tin catalyst (monobutyltin oxide, dibutyltin oxide, etc.), a titanium catalyst (tetrabutyl titanate, etc.), a zirconium catalyst (tetrabutyl zirconate, etc.), a metal acetate catalyst (zinc acetate, etc.), and the like.

In view of antistatic property and of reactivity with the hydrophobic polymer (a), Mn of (b4) is preferably 500-20,000, more preferably 1,000-15,000, and especially preferably 1,200-8,000.

[Block Polymer (A)]

The block polymer (A) in the invention contains a block of hydrophobic polymer (a) and a block of hydrophilic polymer (b) as constituent units.

Among (A), in view of antistatic property, the following (A1) and/or (A2) is preferred.

(A1): a polyetheresteramide obtained by reacting (a1) and (b1) and/or (b2), wherein (a) is a polyamide (a1), and (b) is a polyether (b1) and/or a polyether-containing hydrophilic polymer (b2).

(A2): a block polymer having a structure formed by bonding a block of (a2) and a block of hydrophilic polymer (b) through one or more bonds selected from a group consisting of an ester bond, an amide bond, an ether bond, an imide bond, a urethane bond and a urea bond, wherein (a) is a polyolefin (a2).

In view of antistatic property and water resistance, the weight ratio of a block of (a) to a block of (b) constituting (A) is preferably 10/90-80/20, and more preferably 20/80-75/25.

The structure formed by bonding a block of (a) and a block of (b) constituting (A) is of an (a)-(b) type, an (a)-(b)-(a) type, a (b)-(a)-(b) type, or an [(a)-(b)] n type (n represents an average repetition number).

In view of conductivity, as the structure of the block polymer (A), one of an [(a)-(b)] n type formed by alternatively bonding (a) and (b) is preferred.

In the structure of the [(a)-(b)] n type, in view of conductivity and of mechanical property of the molded article, n is preferably 2-50, more preferably 2.3-30, especially preferably 2.7-20, and most preferably 3-10. n is calculated according to Mn of the block polymer (A) and $^1$H-nuclear magnetic resonance ($^1$H-NMR) analysis.

In view of mechanical property of the later described molded article and antistatic property, Mn of (A) is preferably 2,000-1,000,000, more preferably 4,000-500,000, and especially preferably 6,000-100,000.

In the event (A) has a structure formed by bonding a block of (a) and a block of (b) through an ester bond, an amide bond, an ether bond or an imide bond, (A) is prepared by the following method.

For example, (a) and (b) are injected into a reaction vessel, and under stirring, reacted at a reaction temperature of 100-250° C. under a pressure of 0.003-0.1 MPa for 1-50 hours while water generated by amidation reaction, esterification or imidation (hereinafter referred to as generated water) is removed from the reaction system. In view of antistatic property and water resistance, the weight ratio of (a) to (b) is 10/90-80/20, and more preferably 20/80-75/25.

In the event of esterification, in order to facilitate the reaction, a 0.05-0.5 wt % catalyst, based on the weight of (a) and (b), is preferably employed. As the catalyst, there may be mentioned an inorganic acid (sulfuric acid, hydrochloric acid, etc.), an organic sulfonic acid (methanesulfonic acid, para-toluenesulfonic acid, xylenesulfonic acid, naphthalene-sulfonic acid, etc.), an organometallic compound (dibutyltin oxide, tetraisopropoxy titanate, bis(triethanolamine)titanate, potassium titanium oxalate, etc.), and the like. In the event the catalyst is used, after esterification, the catalyst is neutralized, and removed and refined by using an adsorbent as needed. As the methods of removing the generated water from the reaction system, there may be mentioned the following methods.

(1) A method in which an organic solvent (toluene, xylene, cyclohexane, etc.) that do not dissolve in water is used, the organic solvent and the generated water are subjected to an azeotropic process under a reflux, and only the generated water is removed from the reaction system;

(2) A method in which carrier gas (air, nitrogen, helium, argon, carbon dioxide, etc.) is blown into the reaction system, and the generated water is removed together with the carrier gas from the reaction system;

(3) A method in which the pressure in the reaction system is reduced and the generated water is removed from the reaction system.

In the event (A) has a structure formed by bonding a block of (a) and a block of (b) through a urethane bond or a urea bond, (A) is prepared by the following method.

For example, (a) is injected into a reaction vessel, heated at 30-100° C. under stirring. Then (b) is injected, and (a) and (b) are reacted at the same temperature for 1-20 hours. In view of antistatic property and water resistance, the weight ratio of (a) to (b) is 10/90-80/20, and more preferably 20/80-75/25.

In order to facilitate the reaction, a 0.001-5 wt % catalyst, based on the weight of (a) and (b), is preferably employed. As the catalyst, there may be mentioned an organometallic compound (dibutyltin dilaurate, dioctyltin dilaurate, lead octoate, bismuth octoate, etc.), tertiary amine {triethylenediamine, trialkylamine (trimethylamine, tributylamine, trioctylamine, etc.) containing a C1-8 alkyl group, diazabicycloalkene derivatives [1,8-diazabicyclo[5,4,0]undec-7-ene, etc.]}, and a combination of two or more thereof.

[Organic Fluorine-Modified Polyolefin (B)]

The organic fluorine-modified polyolefin (B) in the invention has at least one fluorohydrocarbon group at a molecular end and/or at a molecular side chain of the polyolefin.

In view of dispersivity in the block polymer (A), the content of fluorine in (B) is preferably 0.1-80 wt %, more preferably 2-60 wt %, and especially 6-50 wt %, based on the weight of (B).

In view of dispersivity in the block polymer (A) and preventing a bleed-out of (B) from a surface of the later described molded article, Mn of (B) is preferably 500-30,000, and more preferably 1,000-20,000.

(B) is prepared by the following methods [1]-[3].

[1] A method in which an olefin or a polyolefin (c1) having a polymeric unsaturated bond and a fluorinated olefin or a fluorine compound (c2) having a double bond such as fluoroalkyl (meta)acrylate are polymerized;

[2] A method in which (c3) is reacted with (c4), wherein (c3) is obtained through modification of an olefin or (c1) with an α,β-unsaturated carboxylic acid (anhydride), and (c4) is a fluorine compound having a group capable of reacting with a carboxylic group (or an anhydride group);

[3] A method in which (c5) is reacted with (c4), wherein (c5) is obtained through modification of an olefin or (c1) through oxidization or hydroformylation, and (c4) is a fluorine compound having a group capable of reacting with a carboxylic group (or an anhydride group).

As the olefin in the method [1], there may be mentioned the C2-30 α-olefin.

As (c1), polyolefins and oligomers thereof (high density, medium density or low density polyethylene, propylene polymer, polybutene, poly-4-methylpentene, ethylene/α-olefin copolymer, propylene/α-olefin copolymer, etc.), polyolefin elastomers (ethylene/propylene rubber, ethylene/propylene/diene copolymer rubber, ethylene/vinyl acetate copolymer, isobutylene-isoprene rubber, butadiene rubber, low crystalline ethylene/propylene copolymer, propylene/butene copolymer, ethylene/vinylester copolymer, ethylene/acrylic ester copolymer, a blend of polypropylene and ethylene/propylene rubber, etc.); thermally degraded products thereof, and mixtures of two or more thereof are included. In addition, the polyolefin (a2) is also included in (c1).

Among the olefin and (c1), in view of miscibility with the block polymer (A), low density polyethylene, propylene polymer, propylene/α-olefin copolymer, oligomers thereof and thermally degraded products thereof are preferred, propylene polymer, propylene/α-olefin copolymer, oligomers thereof and thermally degraded products thereof are more preferred.

As the fluorinated olefin and (c2) in the method [1], there may be mentioned compounds from the following (1)-(9). (In the following constitutional formulas, Me represents a methyl group, Et represents an ethyl group, and Pr represents a propyl group.)

(1) Fluorine-containing alkyl ethylene: $C_6F_{13}CH=CH_2$, $C_8F_{17}CH=CH_2$, and $C_{12}F_{25}CH=CH_2$, $C_{16}F_{27}CH=CH_2$, etc.;

(2) Fluorine-containing alkylallyl: $C_8F_{17}CH_2CH=CH_2$, $C_6F_{13}CH_2CH=CH_2$, etc.;

(3) Compounds having fluorine-containing alkyl groups and (meth)acryloyl groups: $C_7F_{15}CH_2OCOCH=CH_2$, $C_7F_{15}CH_2OCOC(Me)=CH_2$, $CF_3(CF_2)_2CH_2OCOC(Me)=CH_2$, $CF_3(CF_2)_4(CH_2)_2OCOC(Me)=CH_2$, $CF_3(CF_2)_9(CH_2)_2$ OCOC(Me)=CH$_2$, C$_8$F$_{17}$(CH$_2$)$_{11}$OCOC(Me)=CH$_2$, C$_7$F$_{15}$CON(Et)(CH$_2$)$_2$OCOC(Me)=CH$_2$, C$_6$F$_{13}$SO$_2$N(Me)(CH$_2$)$_2$OCOCH=CH$_2$, C$_8$F$_{17}$SO$_2$N(Pr)(CH$_2$)$_2$OCOCH=CH$_2$, C$_8$F$_{17}$SO$_2$N(Me)(CH$_2$)$_2$OCOC(Me)=CH$_2$, C$_8$F$_{17}$SO$_2$N(Me)(CH$_2$)$_{10}$OCOCH$_2$CH=CH$_2$, C$_8$F$_{17}$SO$_2$N(CH$_2$CH$_2$OCOCH=CH$_2$)$_2$, HCF$_2$(CF$_2$)$_7$CH$_2$OCOC(Me)=CH$_2$, etc.;

(4) Maleic mono- or diester having fluorine-containing alkyl groups: C$_6$F$_{13}$(CH$_2$)$_{11}$OCOCH=CHCOOMe, C$_6$F$_{13}$(CH$_2$)$_{11}$OCOCH=CHCOOCH$_2$C$_7$F$_{15}$, etc.;

(5) Vinyl ether or allyl ether having fluorine-containing alkyl groups: C$_7$F$_{15}$CH$_2$OCH=CH$_2$, C$_7$F$_{15}$CH$_2$OCH$_2$CH=CH$_2$, etc.;

(6) Compounds having fluorine-containing alkyl groups and vinylsulfone groups: C$_6$F$_{13}$SO$_2$NHCH$_2$SO$_2$CH=CH$_2$, etc.

(7) Reacted products of amine [C$_6$F$_{13}$CH$_2$CH$_2$NH$_2$, (C$_6$F$_{13}$CH$_2$CH$_2$)$_2$NH, etc.] having fluorine-containing alkyl groups and vinyl monomers [glycidyl (meth)acrylate, methyl (meth)acrylate, isocyanate ethyl(meth)acrylate, etc.];

(8) Reacted products of alcohol (C$_6$F$_{13}$CH$_2$CH$_2$OH) having fluorine-containing alkyl groups and vinyl monomers [glycidyl (meth)acrylate, methyl (meth)acrylate, isocyanate ethyl(meth)acrylate, etc.];

(9) Reacted products of carboxylic acid (C$_6$F$_{13}$COOH, etc.) having fluorine-containing alkyl groups and vinyl monomers [glycidyl (meth)acrylate, diethylaminoethyl (meth)acrylate, 2-hydroxyethyl (meth)acrylate, methylolacrylamide, etc.].

As (c3) in the method [2], there may be mentioned one obtained through modification of (c1) with an α,β-unsaturated carboxylic acid (anhydride). As the α,β-unsaturated carboxylic acid (anhydride), the ones described above may be mentioned. In view of reactivity, maleic anhydride is preferred.

The fluorine compound (c4) having a group capable of reacting with a carboxylic group (or an anhydride group) has at least one fluorohydrocarbon group. Furthermore, the group capable of reacting with a carboxylic group (or an anhydride group) may be one having a hydroxyl group, an amino group or an epoxy group, or having a combination of these functional groups.

Among (c4), as (c4-1) having a hydroxyl group, there may be mentioned CF$_3$CH$_2$OH, CF$_3$(CF$_2$)$_n$CH$_2$OH [n=1-20], CF$_3$(CH$_2$)$_2$OH, CF$_3$(CF$_2$)$_n$(CH$_2$)$_2$OH [n=1-20], CF$_3$(CH$_2$)$_3$OH, CF$_3$(CF$_2$)$_n$(CH$_2$)$_3$OH [n=1-20], CF$_3$(CH$_2$)$_4$OH, CF$_3$(CF$_2$)$_n$(CH$_2$)$_4$OH [n=1-20], CF$_3$(CH$_2$)$_5$OH, CF$_3$(CF$_2$)$_n$(CH$_2$)$_5$OH [n=1-20], CF$_3$(CH$_2$)$_6$OH, CF$_3$(CF$_2$)$_n$(CH$_2$)$_6$OH [n=1-20], CF$_2$HCH$_2$OH, CF$_2$H(CF$_2$)$_n$CH$_2$OH [n=1-20], CF$_2$H(CH$_2$)$_2$OH, CF$_2$H(CF$_2$)$_n$(CH$_2$)$_2$OH [n=1-20], CF$_2$H(CH$_2$)$_3$OH, CF$_2$H(CF$_2$)$_n$(CH$_2$)$_3$OH [n=1-20], CF$_2$H(CH$_2$)$_4$OH, CF$_2$H(CF$_2$)$_n$(CH$_2$)$_4$OH [n=1-20], CF$_2$H(CH$_2$)$_5$OH, CF$_2$H(CF$_2$)$_n$(CH$_2$)$_5$OH [n=1-20], CF$_2$H(CH$_2$)$_6$OH, CF$_2$H(CF$_2$)$_n$(CH$_2$)$_6$OH [n=1-20], CF$_3$(CF$_2$)$_2$OCF(CF$_3$)CH$_2$OH, C$_3$F7OCF(CF$_3$)CF$_2$OCF(CF$_3$)CH$_2$OH, (CF$_3$)$_2$CF(CH$_2$)$_6$OH, (CF$_3$)$_2$CHOH, CF$_3$CHFCF$_2$CH$_2$OH, HOCH$_2$(CF$_2$)$_4$CH$_2$OH, HOCH$_2$(CF$_2$)$_6$CH$_2$OH, (CF$_3$)$_2$C(CH$_3$)CH$_2$OH, and the like. Moreover, there may also be mentioned AO adducts thereof.

Among (c4), as (c4-2) having an amino group, there may be mentioned one obtained by replacing the hydroxyl group in (c4-1) with an amino group.

Among (c4), as the one having an epoxy group, there may be mentioned one obtained by replacing the hydroxyl group in (c4-1) with an epoxy group or with a glycidyl ether group, and the like.

In the method [2], the reaction between (c3) obtained through modification of (c1) with an α,β-unsaturated carboxylic acid (anhydride) and the fluorine compound (c4) having a group capable of reacting with a carboxylic group (or an anhydride group) is carried out by subjecting the carboxylic group or the anhydride group in (c3) and the hydroxyl group or the amino group in (c4) to an addition reaction, or to a dehydration condensation reaction according to a general manufacturing method of ether.

In the reaction, an organic solvent such as benzene, toluene, xylene and chlorobenzene may be used. Moreover, in order to enhance reactivity, the carboxylic group or the anhydride group may be subjected to a condensation reaction once converted into an acid halide group.

In the reaction, a catalyst may be used. As the catalyst, there may be mentioned an inorganic acid (sulfuric acid, hydrochloric acid, etc.), an organic sulfonic acid (methanesulfonic acid, para-toluenesulfonic acid, xylenesulfonic acid, naphthalenesulfonic acid, etc.), an organometallic compound (dibutyltin oxide, tetraisopropoxy titanate, bis(triethanolamine)titanate, potassium titanium oxalate, etc.), and the like. In view of moldability and of antistatic property of the molded article, the amount of the catalyst employed is preferably 5 wt % or less, and more preferably 0.001-1.0 wt %, based on the weight of (c3).

As a modification method through oxidation or hydroformylation in the method [3], the above methods may be mentioned.

[Antistatic Agent (Z)]

The antistatic agent (Z) in the invention contains the block polymer (A) and the organic fluorine-modified polyolefin (B).

In view of mechanical property and antistatic property of the molded article, the weight ratio of (A) to (B) is preferably 99/1-50/50, and more preferably 98/2-60/40.

While the antistatic agent (Z) may be prepared by mixing (A) and (B) through a well-known method, in view of homogeneous mixing, a method of mixing or dispersing (B) into materials of (A) in advance before preparing (A) is preferred.

There is no particular limitation on the time for mixing or dispersing (B) into materials of (A). The time may be before polymerization, during polymerization or right after polymerization.

In view of antistatic property and mechanical property of the molded article, the content of fluorine is preferably 0.0001-30 wt %, and more preferably 0.001-25 wt % based on the weight of (Z).

[Antistatic Resin Composition]

The antistatic resin composition in the invention is formed by containing a thermoplastic resin (C) in the antistatic agent (Z).

As (C), there may be mentioned a polyphenylene ether resin (C1) (PPE); a polyolefin resin (C2) [polypropylene (PP), polyethylene (PE), ethylene-vinyl acetate (EVA) copolymer resin, ethylene-ethyl acrylate copolymer resin, etc.]; a poly(meth)acrylic resin (C3) (polymethyl methacrylate, etc.); a polystyrene resin (C4) [a copolymer containing a vinyl group containing aromatic hydrocarbon alone, or a vinyl group containing aromatic hydrocarbon and at least one selected from a group consisting of (meth)acrylic acid ester, (meth)acrylonitrile and butadiene as constituent units; for example, polystyrene (PS), styrene-acrylonitrile copolymer (AN resin), acrylonitrile-butadiene-styrene copolymer (ABS resin), methyl methacrylate-butadiene-styrene copolymer (MBS resin), styrene-methyl methacrylate copolymer (MS resin), etc.], and the like; a polyester resin (C5) (polyethylene terephthalate, polybutylene terephthalate, polycyclohexanedimethylene terephthalate, polybutylene adipate, or polyethylene adipate); a polyamide resin (C6) (nylon 66, nylon 69, nylon 612, nylon 6, nylon 11, nylon 12, nylon 46, nylon 6/66, nylon 6/12, etc.); a polycarbonate resin (C7) [polycarbonate (PC), PC/ABS alloy resin, etc.] a polyacetal resin (C8), and a mixture of two or more thereof.

Among these, in view of mechanical property of the later described molded article and dispersivity of (Z) in (C), (C1), (C2), (C3), (C4) and (C7) are preferred.

In view of antistatic property and mechanical property of the molded article, the content of (Z) in the antistatic resin composition is preferably 1-10 wt %, and more preferably 2-8 wt %, based on the weight of (C).

The antistatic resin composition may further contain an antistatic promoter (D) within the range where the effects of the invention are not blocked.

As the antistatic promoter (D), there may be mentioned an alkali metal or an alkaline earth metal salt (D1), a quaternary ammonium salt (D2), a surfactant (D3), an ionic liquid (D4), and the like. Two or more of (D1)-(D4) may also be employed in combination.

As the alkali metal or alkaline earth metal salt (D1), there may be mentioned a salt of an alkali metal (lithium, sodium, potassium, etc.) or an alkaline earth metal (magnesium, calcium, etc.) with an organic acid [C1-7 mono- or dicarboxylic acid (formic acid, acetic acid, propionic acid, oxalic acid, succinic acid, etc.), C1-7 sulfonic acid (methanesulfonic acid, p-toluenesulfonic acid, etc.), or thiocyanic acid], or a salt of the above organic acids and an inorganic acid [halogen acid (hydrochloric acid, hydrobromic acid, etc.), perchloric acid, sulfuric acid, nitric acid, phosphoric acid, etc.].

As the quaternary ammonium salt (D2), there may be mentioned a salt of amidinium (1-ethyl-3-methylimidazolium, etc.) or guanidium (2-dimethylamino-1,3,4-trimethyl imidazolinium, etc.) with the above organic acids or inorganic acids.

As the surfactant (D3), there may be mentioned a well-known non-ionic surfactant, an anionic surfactant, a cationic surfactant, an amphoteric surfactant, and the like.

As the ionic liquid (D4), there may be mentioned a compound besides (D1)-(D3), and a molten salt which has a melting point of 25° C. or less, at least one constituting cation or anion being an organic ion, and an initial conductivity of 1-200 ms/cm (preferably 10-200 ms/cm). Specifically, there may be mentioned the molten salt illustrated in WO95/15572, and the like.

In view of antistatic property and preventing an education on a surface of the resin to provide a resin molded article having a good appearance, the content of each of (D1)-(D4) is preferably 5 wt % or less, more preferably 0.001-3 wt %, and especially preferably 0.01-2.5 wt %, based on the weight of the thermoplastic resin (C).

In the event two or more of (D1)-(D4) are employed in combination, in view of antistatic property and preventing an education on a surface of the resin to provide a resin molded article having a good appearance, the total content of (D) is preferably 5 wt % or less, more preferably 0.001-3 wt %, and especially preferably 0.01-2.5 wt %.

As the method of containing (D) in the antistatic resin composition in the invention, in order not to damage the appearance of the later described molded article, a method of dispersing (D) in the antistatic agent (Z) in advance is preferred, and a method of containing (D) in the block polymer (A) in advance during preparation of (A) is more preferred. There is no particular limitation on the time for containing (D) in (A) during preparation of (A). The time may be before polymerization, during polymerization or right after polymerization. However, it is preferred that the material be contained in the material before polymerization.

The antistatic resin composition may contain, in addition to (D), other additives (E) within the range where the effects of the invention are not blocked. As (E), there may be mentioned a colorant (E1), a release agent (E2), an antioxidant (E3), a fire retardant (E4), an ultraviolet absorber (E5), an antibacterial agent (E6), a dispersant (E7), a filling agent (E8), and the like. Two or more of (E) may also be employed in combination.

As the colorant (E1), there may be mentioned an inorganic pigment (white pigment, cobalt compound, iron compound, sulfide, etc.), an organic pigment (azo pigment, polycyclic pigment, etc.), a dye (azo-based, indigoid-based, sulfur-based, alizarin-based, acridine-based, thiazole-based, nitro-based, aniline-based, etc.), and the like.

As the release agent (E2), there may be mentioned an alkyl (C1-4) ester (butyl stearate, etc.) of a C12-18 fatty acid, a glycol (C2-8) ester (ethylene glycol monostearate, etc.) of a C2-18 fatty acid, a polyvalent (trivalent or more) alcohol ester (hydrogenated castor oil, etc.) of a C2-18 fatty acid, a liquid paraffin, and the like.

As the antioxidant (E3), there may be mentioned a phenolic compound [monocyclic phenol (2,6-di-tert-butyl-p-cresol, etc.), bisphenol [2,2'-methylenebis(4-methyl-6-t-butyl phenol), etc.], polycyclic phenol [1,3,5-trimethyl-2,4,6-tris(3,5-di-t-butyl-4-hydroxybenzyl)benzene, etc.], etc.], a sulfur compound (dilauryl-3,3'-thiodipropionate, etc.), a phosphorus compound (triphenyl phosphate, etc.), an amine compound (octyl diphenylamine, etc.), and the like.

As the fire retardant (E4), there may be mentioned a halogen-containing fire retardant, a nitrogen-containing fire retardant, a sulfur-containing fire retardant, a silicon-containing fire retardant, a phosphorus-containing fire retardant, and the like.

As the ultraviolet absorber (E5), there may be mentioned benzotriazole [2-(2'-hydroxy-5'-methylphenyl)benzotriazole, etc.], benzophenone (2-hydroxy-4-methoxybenzophenone, etc.), salicylate (phenyl salicylate, etc.), acrylate (2 ethylhexyl-2-cyano-3,3'-diphenyl acrylate, etc.), and the like.

As the antibacterial agent (E6), there may be mentioned a benzoic acid, a sorbic acid, halogenated phenol, organic iodine, nitrile (2,4,5,6-tetrachloroisophthalonitrile, etc.), thiocyanate (methylene bisthiocyanate, etc.), N-halo alkyl thioimide, copper fungicide (8-oxyquinoline copper, etc.), benzimidazole, benzothiazole, trihaloallyl, triazole, an organic nitrogen sulfur compound (Slaoff 39, etc.), a quaternary ammonium compound, a pyridine-based compound, and the like.

As the dispersant (E7), there may be mentioned a modified vinyl polymer having at least one functional group (polar group) selected from a group consisting of a carboxyl group, an epoxy group, an amino group, a hydroxyl group, a polyoxyalkylene (for example, the polymer described in Japanese Patent Publication no. H03-258850, the modified vinyl polymer having a sulfonic group as well as the block polymer having a polyolefin moiety and an aromatic vinyl polymer moiety described in Japanese Patent Publication no. H06-345927, etc.), and the like.

As the filling agent (E8), there may be mentioned an inorganic filling agent (calcium carbonate, talc, clay, etc.), an organic filling agent (urea, calcium stearate, etc.), and the like.

In view of mechanical property of the molded article, the total content of (E) is preferably 45 wt % or less, more preferably 0.001-40 wt %, and especially preferably 0.01-35 wt %, based on the weight of the thermoplastic resin (C).

In view of mechanical property of the molded article, the content of (E1) is preferably 0.1-3 wt % or less, and more preferably 0.2-2 wt %.

In view of mechanical property of the molded article, the content of each of (E2), (E3) and (E5) is preferably 0.01-3 wt %, and more preferably 0.05-1 wt %.

In view of mechanical property of the molded article, the content of each of (E4) and (E6) is preferably 0.5-20 wt %, and more preferably 1-10 wt %.

In view of mechanical property of the molded article, the content of each of (E7) and (E8) is preferably 0.5-10 wt %, and more preferably 1-5 wt %.

The antistatic resin composition in the invention may be formed by melt blending the antistatic agent (Z) and the thermoplastic resin (C) in the invention, and, as needed, (D) and (E). As the method of melt blending, a method of mixing each component, generally in pellet or powder form, by a suitable mixer (Henschel mixer, etc.), and then melt blending them by an extruder for pelletization may be used.

There is no particular limitation on the order of addition of each component during the melt blending. The methods include, for example:

[1] A method in which after (Z) is melt blended, (C) and, as needed, (D) and (E) are injected thereinto together to be melt blended;

[2] A method in which after (Z) is melt blended, a portion of (C) is melt blended in advance to prepare a highly concentrated composition (masterbatch resin composition) of (Z), the remaining (C) and, as needed, (D) and (E) are melt blended (masterbatch method or master pellet method).

The concentration of (Z) in the masterbatch resin composition in the method [2] is preferably 40-80 wt %, and more preferably 50-70 wt %.

Among the methods [1] and [2], in view of ease of dispersion of (Z) in (C) with efficiency, the method [2] is preferred.

[Antistatic Resin Molded Article]

The antistatic resin molded article in the invention is formed by molding the antistatic resin composition. As the molding method, there may be mentioned injection molding, compression molding, calendering, slush molding, rotational molding, extrusion molding, blow molding, film molding (cast method, tenter method, inflation method, etc.), and the like. The molding may also be achieved by any of means such as single-layer molding, multi-layer molding or foam molding, depending on purposes.

The molded article in the invention has not only excellent mechanical property and permanent antistatic property, but also good coating property and printability. A molded product is formed by coating and/or printing the molded article.

As the method of coating the molded article, there may be mentioned air spray coating, airless spray coating, electrostatic spray coating, dip coating, roller coating, brush coating, and the like. However, the invention is not limited thereto.

As the coating, a coating generally used for plastic coating may be employed, and specifically, there may be mentioned a polyester-melamine resin coating, epoxy-melamine resin coating, acrylic melamine resin coating, acrylic urethane resin coating, and the like.

The coating film thickness (dry film thickness) may be appropriately selected depending on purposes; however, it is generally 10-50 μm.

As the method of printing onto the molded article or onto a coated surface of the molded article, one of printing methods generally used for plastic printing may be employed, and there may be mentioned gravure printing, flexographic printing, screen printing, pad printing, dry offset printing, offset printing, and the like.

As the printing ink, one generally used for plastic printing may be employed, and there may be mentioned gravure ink, flexographic ink, screen ink, pad ink, dry offset ink, offset ink, and the like.

EXAMPLES

The invention is described below with reference to examples, but the invention is not limited thereto. In addition, parts in the examples represent weight parts.

Preparation Example 1

Preparation of the Polyamide (a1-1)

In a pressure resistant reaction vessel made of stainless steel having a mixer, a thermometer, a heating cooling apparatus, a nitrogen introduction pipe and a decompression device, 173 parts of 8-caprolactam, 33.2 parts of terephthalic acid, 0.4 part of an antioxidant ("Irganox 1010," manufactured by Ciba Specialty Chemicals) and 10 parts of water were injected, and after nitrogen purge, while being sealed, stirred and heated to 220° C., then stirred for 4 hours at the same temperature (under a pressure of 0.2-0.3 MPa), thereby obtaining the polyamide (a1-1) having a carboxyl group at two terminals. (a1-1) had an acid value of 111 and an Mn of 1,000.

Preparation Example 2

Preparation of the Polyolefin (a2-1-1α) Having a Carboxyl Group at Two Terminals In a pressure resistant reaction vessel same as that of Preparation Example 1, 90 parts of a low molecular weight polypropylene [obtained by thermally degrading a polypropylene (MFR: 10 g/10 min) at 410±0.1° C. under nitrogen ventilation (80 mL/min) for 16 minutes; having an Mn of 3,400, 7.0 double bonds per 1,000 carbons, an average of 1.8 double bonds per molecule, and 90 wt % of a polyolefin having two modifiable terminals], 10 parts of maleic anhydride, and 30 parts of xylene were injected, after uniform mixing and nitrogen purge, while being sealed, stirred and heated to 200° C. to be melted, and then reacted for 10 hours at the same temperature. Next, the remaining maleic anhydride and xylene were distilled off for 3 hours at 200° C. under a reduced pressure (0.013 Mpa or less), thereby obtaining 95 parts of the polyolefin (a2-1-1α) having a carboxyl group at two terminals. (a2-1-1α) had an acid value of 27.5 and an Mn of 3,600.

Preparation Example 3

Preparation of the Polyolefin (a2-1-2) Obtained Through Secondary Modification of (a2-1-1α)

In a pressure resistant reaction vessel same as that of Preparation Example 1, 88 parts of (a2-1-1α) and 12 parts of 12-aminododecanoic acid were injected, after uniform mixing, stirred and heated to 200° C. under a nitrogen atmosphere, and then reacted for 3 hours at the same temperature under a reduced pressure (0.013 Mpa or less), thereby obtaining 96 parts of the polyolefin (a2-1-2) obtained through secondary modification. (a2-1-2) had an acid value of 24.8 and an Mn of 4,000.

Preparation Example 4

Preparation of the Polyolefin (a2-2) Having a Hydroxyl Group at Two Terminals 98 parts of a polyolefin (a2-1-1β) having a carboxyl group at two terminals were obtained in the same way as described in Preparation Example 2, except that 90 parts of the low molecular weight polypropylene obtained through a thermal degradation method and 10 parts of maleic anhydride were replaced with 94 parts of a low molecular weight ethylene-propylene random copolymer obtained through a thermal degradation method and 6 parts of maleic anhydride. (a2-1-1β) had an acid value of 9.9 and an Mn of 10,200. In addition, the low molecular weight ethylene-propylene random copolymer (having an Mn of 10,000, 2.5 double bonds per 1,000 carbons, an average of 1.8 double bonds per molecule, and 90 wt % of a polyolefin having two modifiable terminals) obtained through a thermal degradation method is obtained by thermally degrading an ethylene-propylene random copolymer (having a content of ethylene of 2 wt % and an MFR of 10 g/10 min) at 410±0.1° C. under nitrogen ventilation (80 mL/min) for 14 minutes.

Next, in a pressure resistant reaction vessel same as that of Preparation Example 1, 97 parts of (a2-1-1β) and 5 parts of ethanolamine were injected, stirred and heated to 180° C. under a nitrogen atmosphere, and then reacted for 2 hours at the same temperature. Thereafter, the remaining ethanolamine was distilled off for 2 hours at 180° C. under a reduced pressure (0.013 Mpa or less), thereby obtaining the polyolefin (a2-2) having a hydroxyl group at two terminals of a polymer. (a2-2) had a hydroxyl value of 9.9, an amine value of 0.01, and an Mn of 10,200.

Preparation Example 5

Preparation of the Modified Polyolefin (a2-3) Having an Amino Group at Two Terminals is a Polyolefin 92 parts of a polyolefin (a2-1-1γ) having a carboxyl group at two terminals were obtained in the same way as described in Preparation Example 2, except that 90 parts of the low molecular weight polypropylene obtained through a thermal degradation method and 10 parts of maleic anhydride were replaced with 80 parts of a low molecular weight propylene obtained through a thermal degradation method and 20 parts of maleic anhydride. (a2-1-1γ) had an acid value of 64.0 and an Mn of 1,700. In addition, the low molecular weight propylene obtained through a thermal degradation method (having an Mn of 1,500, 17.8 double bonds per 1,000 carbons, an average of 1.94 double bonds per molecule, and 98 wt % of a polyolefin having two modifiable terminals) is obtained by thermally degrading an ethylene-propylene random copolymer (having a content of ethylene of 3 wt % and an MFR of 7 g/10 min) at 410±0.1° C. for 18 minutes.

Next, in a pressure resistant reaction vessel same as that of Preparation Example 1, 90 parts of (a2-1-1γ) and 10 parts of bis(2-aminoethyl)ether were injected, stirred and heated to 200° C. under a nitrogen atmosphere, and then reacted for 2 hours at the same temperature. Thereafter, the remaining bis(2-aminoethyl)ether was distilled off for 2 hours at 200° C. under a reduced pressure (0.013 Mpa or less), thereby obtaining the polyolefin (a2-3) having a an amino group at two terminals of a polymer. (a2-3) had an amine value of 64.0 and an Mn of 1,700.

Preparation Example 6

Preparation of the Cationic Polymer (b3)

In a pressure resistant reaction vessel same as that of Preparation Example 1, 41 parts of N-methyldiethanolamine, 49 parts of adipic acid, and 0.3 part of zirconium acetate were injected, and after nitrogen purge, heated to 220° C. for 2 hours and depressurized to 0.013 MPa for 1 hour for polyesterification. After the polyesterification is completed, a resulting product was cooled to 50° C., and was then dissolved by adding 100 parts of methanol. The solution was stirred while the temperature in the reaction vessel was kept at 120° C., and 31 parts of dimethyl carbonate was slowly dropped over 3 hours and aged for 6 hours at the same temperature. After being cooled to room temperature, 110 parts of 60 wt % hexafluorophosphate solution was added, and the product was stirred at room temperature for 1 hour. Next, methanol was distilled off, thereby obtaining the cationic polymer (b3) having an average of 12 quaternary ammonium groups. (b3) had a hydroxyl value of 30.1, an acid value of 0.5, and a volume intrinsic resistance of $1\times10^5$ Ω·cm.

Preparation Example 7

Preparation of an Anionic Polymer (b4α)

In a pressure resistant reaction vessel same as that of Preparation Example 1, 114 parts of diethylene glycol, 268 parts of dimethyl 5-سulfoisophthalate sodium salt and 0.2 part of dibutyltin oxide were injected, heated to 190° C. under a reduced pressure of 0.067 MPa, and then subjected to transesterification for 6 hours at the same temperature, while methanol was distilled off, thereby obtaining the anionic polymer (b4α) having an average of 6 sodium sulfonate salt groups in 1 molecule. (b4α) had a hydroxyl value of 49, an acid value of 0.6, and a volume intrinsic resistance of $3\times10^8$ Ω·cm.

Preparation Example 8

Preparation of an Anionic Polymer (b4β)

In a pressure resistant reaction vessel same as that of Preparation Example 1, 67 parts of PEG (having an Mn of 300), 49 parts of dimethyl 5-sulfoisophthalate sodium salt and 0.2 part of dibutyltin oxide were injected, heated to 190° C. under a reduced pressure of 0.067 MPa, and then subjected to transesterification for 6 hours at the same temperature, while methanol was distilled off, thereby obtaining the anionic polymer (b4β) having an average of 5 sodium sulfonate salt groups in 1 molecule. (b4β) had a hydroxyl value of 29.6, an acid value of 0.4, and a volume intrinsic resistance of $2\times10^6$ Ω·cm.

Preparation Example 9

Preparation of a Block Polymer (A1-1)

In a pressure resistant reaction vessel having a mixer, a thermometer, and a heating cooling apparatus, 199 parts of (a1-1), 780 parts of an EO adduct of bisphenol A (having an Mn of 4,000 and a volume intrinsic resistance of $2\times10^7$ Ω·cm), and 0.6 part of zirconyl acetate were injected, stirred and heated to 240° C., then subjected to polymerization for 6 hours at the same temperature under a reduced pressure (0.013 Mpa or less), thereby obtaining a viscous block polymer (A1-1). (A1-1) had an Mn of 24,000.

Preparation Example 10

Preparation of a Block Polymer (A1-2)

In a pressure resistant reaction vessel same as that of Preparation Example 9, 143 parts of (a1-1), 320 parts of (b4α), and 0.3 part of the antioxidant "Irganox 1010" were injected, stirred and heated to 240° C., then subjected to polymerization for 5 hours at the same temperature under a reduced pressure (0.013 Mpa or less), thereby obtaining a viscous block polymer (A1-2). (A1-2) had an Mn of 21,000.

Preparation Example 11

Preparation of a Block Polymer (A2-1)

In a pressure resistant reaction vessel same as that of Preparation Example 9, 67.1 parts of (a2-1-1α), 32.9 parts of the polyether diamine (b1-2) [α,ω-diaminoPEG (having an Mn of 2,000 and a volume intrinsic resistance of $1 \times 10^7$ Ω·cm)], 0.3 part of the antioxidant "Irganox 1010", and 0.5 part of zirconyl acetate were injected, stirred and heated to 220° C., then subjected to polymerization for 3 hours at the same temperature under a reduced pressure (0.013 Mpa or less), thereby obtaining a viscous block polymer (A2-1). (A2-1) had an Mn of 50,000.

Preparation Example 12

Preparation of a Block Polymer (A2-2)

A block polymer (A2-2) was obtained in the same way as described in Preparation Example 11, except that 67.1 parts of (a2-1-1α) and 32.9 parts of (b1-2) were replaced with 60.1 parts of (a2-1-2) and 39.9 parts of polyether diol (b1-1α) (PEG having an Mn of 3,000 and a volume intrinsic resistance of $1 \times 10^7$ Ω·cm). (A2-2) had an Mn of 30,000.

Preparation Example 13

Preparation of a Block Polymer (A2-3)

A block polymer (A2-3) was obtained in the same way as described in Preparation Example 11, except that 67.1 parts of (a2-1-1α) and 32.9 parts of (b1-2) were replaced with 48.0 parts of (a2-2), 48.0 parts of (b3), and 4 parts of dodecanedioic acid. (A2-3) had an Mn of 100,000.

Preparation Example 14

Preparation of a Block Polymer (A2-4)

A block polymer (A2-4) was obtained in the same way as described in Preparation Example 11, except that 67.1 parts of (a2-1-1α) and 32.9 parts of (b1-2) were replaced with 31.6 parts of (a2-4), 68.4 parts of (b4β), and 8 parts of dodecanedioic acid. (A2-4) had an Mn of 10,000.

Preparation Example 15

Preparation of a Block Polymer (A2-5)

A block polymer (A2-5) was obtained in the same way as described in Preparation Example 11, except that 67.1 parts of (a2-1-1α) and 32.9 parts of (b1-2) were replaced with 71.5 parts of (a2-1-2) and 28.5 parts of polyether diol (b1-1β) [polytetramethylene glycol having an Mn of 1,800 and a volume intrinsic resistance of $1 \times 10^{11}$ Ω·cm]. (A2-5) had an Mn of 40,000.

Preparation Example 16

Preparation of a Block Polymer (A2-6)

A block polymer (A2-6) was obtained in the same way as described in Preparation Example 11, except that 67.1 parts of (a2-1-1α) and 32.9 parts of (b1-2) were replaced with 48.0 parts of (a2-2), 48.0 parts of (b3) and 3 parts of hexamethylene diisocyanate (HDI). (A2-6) had an Mn of 100,000.

Preparation Example 17

Preparation of an Organic Fluorine-Modified Polyolefin (B-1)

In a pressure resistant reaction vessel same as that of Preparation Example 1, 180 parts of xylene, 40 parts of low molecular polyolefin ("Sanwax 161P," manufactured by Sanyo Chemical Industries, Ltd.) and 60 parts of perfluoroalkyl ethylene (manufactured by Daikin Industries, Ltd.) were injected, stirred and heated to 125° C. under a nitrogen atmosphere, and then stirred for 2 hours at the same temperature after instillation of 1.25 parts of di-t-butyl oxide for 10 minutes. Next, a resulting product was stirred for 2 hours at 125° C. after instillation of 0.63 part of di-t-butyl oxide for 10 minutes at the same temperature. Xylene was distilled off for 2 hours at 125° C. under a reduced pressure (0.013 Mpa or less), thereby obtaining an organic fluorine-modified polyolefin (B-1) having a fluorohydrocarbon group at a molecular side chain. The content of fluorine in (B-1) was 60 wt %.

Preparation Example 18

Preparation of an Organic Fluorine-Modified Polyolefin (B-2)

In a pressure resistant reaction vessel same as that of Preparation Example 1, 99.99 parts of (a2-1-1α) and 0.01 part of 1H,1H-tridecafluoroheptylamine were injected, stirred and heated to 170° C., and then stirred for 1 hour at the same temperature. Next, unreacting 1H,1H-tridecafluoroheptylamine was distilled off for 2 hours at 170° C. under a reduced pressure (0.013 Mpa or less), thereby obtaining an organic fluorine-modified polyolefin (B-2) having a fluorohydrocarbon group at a molecular end. The content of fluorine in (B-2) was 0.01 wt %.

Preparation Example 19

Preparation of an Organic Fluorine-Modified Polyolefin (B-3)

In a pressure resistant reaction vessel same as that of Preparation Example 1, 97 parts of acid-modified polyolefin ("Umex 1001," manufactured by Sanyo Chemical Industries, Ltd.) and 3 parts of 1H,1H,2H,2H-heptadecafluoro-1-decanol were injected, stirred and heated to 170° C., and then stirred for 1 hour at the same temperature. Next, unreacting 1H,1H,2H,2H-heptadecafluoro-1-decanol was distilled off for 2 hours at 170° C. under a reduced pressure (0.013 Mpa or less), thereby obtaining an organic fluorine-modified polyolefin (B-3) having a fluorohydrocarbon group at a molecular side chain. The content of fluorine in (B-3) was 2 wt %.

Preparation Example 20

Preparation of an Organic Fluorine-Modified Polyolefin (B-4)

In a stainless steel autoclave, 90 parts of acid-modified polyolefin ("Umex 2000," manufactured by Sanyo Chemical Industries, Ltd.) and 10 parts of 3-perfluorobutyl-1,2-epoxypropane were injected, stirred and heated to 170° C., and then stirred for 1 hour at the same temperature. Next, unreacting 3-perfluorobutyl-1,2-epoxypropane was distilled off for 2 hours at 170° C. under a reduced pressure (0.013 Mpa or less), thereby obtaining an organic fluorine-modified polyolefin (B-4) having a fluorohydrocarbon group at a molecular side chain. The content of fluorine in (B-4) was 8 wt %.

Embodiments 1-13 and Comparative Examples 1-2

According to the formulations shown in Table 1, the ingredients were blended for 3 minutes by a Henschel mixer, and then melt mixed at 200° C. by a twin-screw extruder fitted with a belt at 100 rpm at a residence time of 5 minutes to obtain each of the antistatic agents in Embodiments 1-13 and Comparative Examples 1-2.

TABLE 1

| | | | Embodiment | | | | | | | |
|---|---|---|---|---|---|---|---|---|---|---|
| | | | 1 (Z-1) | 2 (Z-2) | 3 (Z-3) | 4 (Z-4) | 5 (Z-5) | 6 (Z-6) | 7 (Z-7) | 8 (Z-8) |
| Antistatic agent (Z) | | | | | | | | | | |
| Formulation composition | Block polymer (A) | (A1-1) | 80 | — | — | — | — | — | — | — |
| | | (A1-2) | — | 80 | — | — | — | — | — | — |
| | | (A2-1) | — | — | 80 | — | — | — | — | — |
| | | (A2-2) | — | — | — | — | 80 | — | — | — |
| | | (A2-3) | — | — | — | 80 | — | — | — | — |
| | | (A2-4) | — | — | — | — | — | 80 | — | — |
| | | (A2-5) | — | — | — | — | — | — | 50 | — |
| | | (A2-6) | — | — | — | — | — | — | — | 60 |
| | Organic fluorine-modified polyolefin (B) | (B-1) | 20 | — | 20 | — | — | — | 50 | 40 |
| | | (B-2) | — | 20 | — | 20 | — | — | — | — |
| | | (B-3) | — | — | — | — | 20 | — | — | — |
| | | (B-4) | — | — | — | — | — | 20 | — | — |
| | Polyolefin having a carboxyl group at two terminals | (a2-1-1α) | — | — | — | — | — | — | — | — |
| Content of fluorine in (Z) (wt %) | | | 12 | 0.002 | 12 | 0.002 | 0.4 | 1.6 | 30 | 24 |

| | | | Embodiment | | | | | Comparative Example | |
|---|---|---|---|---|---|---|---|---|---|
| | | | 9 (Z-9) | 10 (Z-10) | 11 (Z-11) | 12 (Z-12) | 13 (Z-13) | 1 (Z'-1) | 2 (Z'-2) |
| Antistatic agent (Z) | | | | | | | | | |
| Formulation composition | Block polymer (A) | (A1-1) | — | — | — | — | — | 80 | — |
| | | (A1-2) | — | — | — | — | — | — | — |
| | | (A2-1) | 99 | 90 | — | 99.5 | — | — | 80 |
| | | (A2-2) | — | — | — | — | — | — | — |
| | | (A2-3) | — | — | 98 | — | — | — | — |
| | | (A2-4) | — | — | — | — | 40 | — | — |
| | | (A2-5) | — | — | — | — | — | — | — |
| | | (A2-6) | — | — | — | — | 60 | — | — |
| | Organic fluorine-modified polyolefin (B) | (B-1) | — | — | — | — | — | — | — |
| | | (B-2) | 1 | 10 | — | 0.5 | — | — | — |
| | | (B-3) | — | — | 2 | — | — | — | — |
| | | (B-4) | — | — | — | — | — | — | — |
| | Polyolefin having a carboxyl group at two terminals | (a2-1-1α) | — | — | — | — | — | 20 | 20 |
| Content of fluorine in (Z) (wt %) | | | 0.0001 | 0.001 | 0.04 | 0.00005 | 36 | 0 | 0 |

Embodiments 14-34 and Comparative Examples 3-13

According to the formulations shown in Tables 2 and 3, the ingredients were blended for 3 minutes by a Henschel mixer, and then melt mixed at 200° C. by a twin-screw extruder fitted with a belt at 100 rpm at a residence time of 5 minutes to obtain each of the antistatic resin compositions in Embodiments 14-34 and Comparative Examples 3-13.

Markers in Tables 2 and 3 represent the following contents.

(C-1): high-impact PS resin ("HIPS 433," manufactured by PS Japan Co., Ltd.)

(C-2): ABS resin ("Cevian 680SF," manufactured by Daicel Polymer Co., Ltd.)

(C-3): PC/ABS resin ["Cycloloy C6600," manufactured by SABIC Innovative Plastics (Japan) Co., Ltd.]

(C-4): modified PPE resin ["Noryl V-095," manufactured by SABIC Innovative Plastics (Japan) Co., Ltd.]

(C-5): PP resin ("PM771M," manufactured by SunAllomer Co., Ltd.)

(D1-1): 1-ethyl-3-methylimidazolium bis(trifluoromethylsulfonyl)imide (D1-2): dodecylbenzenesulfonic acid sodium salt (D2-1): epoxylated polystyrene-based elastomer ("Epofriend AT501," manufactured by Daicel Chemical Industry Co., Ltd.; compatibilizer)

(D4-1): antioxidant {"Irganox 1010," manufactured by Ciba Specialty Chemicals Co., Ltd.; tetrakis[methylene-3-(3',5'-di-t-butyl-4'-hydroxyphenyl)propionate]methane}.

The obtained antistatic resin composition was molded by using an injection molding machine ("PS40E5ASE," manufactured by Nissei Plastic Industrial Co., Ltd.) at a cylinder temperature of 220° C. [in the event where (C-1) was used] or 230° C. [in the events where (C-2)-(C-5) were used] and a mold temperature of 50° C. to fabricate a test piece. Then, the test piece was evaluated by the following performance test. The results were shown in Tables 2 and 3.

Performance Test (1) Surface Intrinsic Resistance (Unit: Ω)

The surface intrinsic resistance was determined according to ASTM D257. The test was conducted with the test piece (100×100×2 mm) by using an ultra megohm meter ("DSM-8103," manufactured by TOA Electronics, LTD.] in a gas environment at 23° C. with a humidity of 50% RH.

(2) Surface Intrinsic Resistance after Washing (Unit: Ω)

The obliquely erected test piece (100×100×2 mm) was washed with 100 mL running ion exchange water at a flow rate of 100 mL/min at 23° C., and was dried by using an air circulation dryer (80° C.) for 3 hours. These washing and drying operations were repeated 10 times, and then the obtained test piece was tested under the same conditions as in (1).

(3) Impact Strength (Unit: J/m)

The impact strength was tested according to ASTM D256 Method A (fitted with a notch and being 3.2 mm thick).

(4) Appearance (4-1) Surface Appearance

The appearance of a surface of the test piece (100×100×2 mm) was visually observed and evaluated according to the following standards.

[Evaluation Standards]

○ No abnormity, good (equivalent to the thermoplastic resin without the antistatic agent).

x Surface irregularity and blister are observed.

(4-2) Cross-Section Appearance

The test piece (100×100×2 mm) was cut, with a cutter, at a central part of a plane and in a direction that is vertical to the plane of the test piece, and the cross section was observed and evaluated according to the following standards.

[Evaluation Standards]

○ The cross section is even and good (equivalent to the thermoplastic resin without the antistatic agent).

x The cross section is layered, and uneven.

TABLE 2

| | | | Embodiment | | | | | | | | | | |
|---|---|---|---|---|---|---|---|---|---|---|---|---|---|
| | | | 14 | 15 | 16 | 17 | 18 | 19 | 20 | 21 | 22 | 23 | 24 |
| Formulation composition | Antistatic agent | (Z-1) | 3 | — | — | — | — | — | — | — | — | — | — |
| | | (Z-2) | — | 3 | — | — | — | — | — | — | — | — | — |
| | | (Z-3) | — | — | 3 | — | — | — | — | — | — | — | — |
| | | (Z-4) | — | — | — | 3 | — | — | — | — | — | — | — |
| | | (Z-5) | — | — | — | — | 3 | — | — | — | — | — | — |
| | | (Z-6) | — | — | — | — | — | 3 | — | — | — | — | — |
| | | (Z-7) | — | — | — | — | — | — | 3 | — | — | — | — |
| | | (Z-8) | — | — | — | — | — | — | — | 3 | — | — | — |
| | | (Z-9) | — | — | — | — | — | — | — | — | 3 | — | — |
| | | (Z-10) | — | — | — | — | — | — | — | — | — | 3 | — |
| | | (Z-11) | — | — | — | — | — | — | — | — | — | — | 3 |
| | | (Z-12) | — | — | — | — | — | — | — | — | — | — | — |
| | | (Z-13) | — | — | — | — | — | — | — | — | — | — | — |
| | | (A1-1) | — | — | — | — | — | — | — | — | — | — | — |
| | | (A2-1) | — | — | — | — | — | — | — | — | — | — | — |
| | | (Z'-1) | — | — | — | — | — | — | — | — | — | — | — |
| | | (Z'-2) | — | — | — | — | — | — | — | — | — | — | — |
| | Thermoplastic resin | (C-1) | 100 | 100 | 100 | 100 | 100 | 100 | 100 | 100 | 100 | 100 | 100 |
| | | (C-2) | — | — | — | — | — | — | — | — | — | — | — |
| | | (C-3) | — | — | — | — | — | — | — | — | — | — | — |
| | | (C-4) | — | — | — | — | — | — | — | — | — | — | — |
| | | (C-5) | — | — | — | — | — | — | — | — | — | — | — |
| | Antistatic promoter | (D1-1) | 0.15 | 0.15 | 0.15 | 0.15 | 0.15 | 0.15 | 0.15 | 0.15 | 0.15 | 0.15 | 0.15 |
| | | (D1-2) | — | — | — | — | — | — | — | — | — | — | — |
| | Compatibilizer | (D2-1) | — | — | — | — | — | — | — | — | — | — | — |
| | Antioxidant | (D4-1) | 0.1 | 0.1 | 0.1 | 0.1 | 0.1 | 0.1 | 0.1 | 0.1 | 0.1 | 0.1 | 0.1 |

TABLE 2-continued

| Evaluation of molded article | Surface intrinsic resistance (Ω) | $7 \times 10^{11}$ | $5 \times 10^{11}$ | $5 \times 10^{10}$ | $8 \times 10^9$ | $5 \times 10^{10}$ | $2 \times 10^{10}$ | $5 \times 10^{12}$ | $1 \times 10^{12}$ | $5 \times 10^{11}$ | $5 \times 10^{11}$ | $2 \times 10^{10}$ |
|---|---|---|---|---|---|---|---|---|---|---|---|---|
| | Surface intrinsic resistance (Ω) after washing | $7 \times 10^{11}$ | $5 \times 10^{11}$ | $5 \times 10^{10}$ | $8 \times 10^9$ | $5 \times 10^{10}$ | $2 \times 10^{10}$ | $5 \times 10^{12}$ | $1 \times 10^{12}$ | $5 \times 10^{11}$ | $5 \times 10^{11}$ | $2 \times 10^{10}$ |
| | Izod impact strength (J/m) | 110 | 110 | 110 | 110 | 110 | 110 | 110 | 110 | 110 | 110 | 110 |
| Appearance | Surface | ○ | ○ | ○ | ○ | ○ | ○ | ○ | ○ | ○ | ○ | ○ |
| | Cross section | ○ | ○ | ○ | ○ | ○ | ○ | ○ | ○ | ○ | ○ | ○ |

| | | | Embodiment | | | | | | | | | |
|---|---|---|---|---|---|---|---|---|---|---|---|---|
| | | | 25 | 26 | 27 | 28 | 29 | 30 | 31 | 32 | 33 | 34 |
| Formulation composition | Antistatic agent | (Z-1) | — | — | — | — | — | — | — | — | — | — |
| | | (Z-2) | — | — | — | — | — | — | — | — | — | — |
| | | (Z-3) | — | — | — | — | — | — | — | — | — | — |
| | | (Z-4) | 1 | 2 | — | — | — | — | — | — | — | — |
| | | (Z-5) | — | — | 8 | 10 | 3 | 3 | 3 | 3 | — | — |
| | | (Z-6) | — | — | — | — | — | — | — | — | — | — |
| | | (Z-7) | — | — | — | — | — | — | — | — | — | — |
| | | (Z-8) | — | — | — | — | — | — | — | — | — | — |
| | | (Z-9) | — | — | — | — | — | — | — | — | — | — |
| | | (Z-10) | — | — | — | — | — | — | — | — | — | — |
| | | (Z-11) | — | — | — | — | — | — | — | — | — | — |
| | | (Z-12) | — | — | — | — | — | — | — | — | 3 | — |
| | | (Z-13) | — | — | — | — | — | — | — | — | — | 3 |
| | | (A1-1) | — | — | — | — | — | — | — | — | — | — |
| | | (A2-1) | — | — | — | — | — | — | — | — | — | — |
| | | (Z'-1) | — | — | — | — | — | — | — | — | — | — |
| | | (Z'-2) | — | — | — | — | — | — | — | — | — | — |
| | Thermoplastic resin | (C-1) | 100 | 100 | 100 | 100 | — | — | — | — | 100 | 100 |
| | | (C-2) | — | — | — | — | 100 | — | — | — | — | — |
| | | (C-3) | — | — | — | — | — | 100 | — | — | — | — |
| | | (C-4) | — | — | — | — | — | — | 100 | — | — | — |
| | | (C-5) | — | — | — | — | — | — | — | 100 | — | — |
| | Antistatic promoter | (D1-1) | 0.05 | 0.1 | — | — | 0.15 | 0.15 | 0.15 | 0.15 | 0.15 | 0.15 |
| | | (D1-2) | — | — | 0.4 | 0.5 | — | — | — | — | — | — |
| | Compatibilizer | (D2-1) | — | — | — | — | — | — | — | — | — | — |
| | Antioxidant | (D4-1) | 0.1 | 0.1 | 0.1 | 0.1 | 0.1 | 0.1 | 0.1 | 0.1 | 0.1 | 0.1 |
| Evaluation of molded article | Surface intrinsic resistance (Ω) | | $5 \times 10^{12}$ | $5 \times 10^{11}$ | $8 \times 10^9$ | $7 \times 10^9$ | $1 \times 10^{11}$ | $1 \times 10^{11}$ | $5 \times 10^{10}$ | $5 \times 10^{10}$ | $7 \times 10^{12}$ | $5 \times 10^{10}$ |
| | Surface intrinsic resistance (Ω) after washing | | $5 \times 10^{12}$ | $5 \times 10^{11}$ | $8 \times 10^9$ | $7 \times 10^9$ | $1 \times 10^{11}$ | $1 \times 10^{11}$ | $5 \times 10^{10}$ | $5 \times 10^{10}$ | $7 \times 10^{12}$ | $5 \times 10^{10}$ |
| | Izod impact strength (J/m) | | 110 | 110 | 110 | 110 | 150 | 90 | 90 | 80 | 110 | 100 |
| Appearance | Surface | | ○ | ○ | ○ | ○ | ○ | ○ | ○ | ○ | ○ | ○ |
| | Cross section | | ○ | ○ | ○ | ○ | ○ | ○ | ○ | ○ | ○ | ○ |

TABLE 3

| | | | Comparative Example | | | | | | | | | | |
|---|---|---|---|---|---|---|---|---|---|---|---|---|---|
| | | | 3 | 4 | 5 | 6 | 7 | 8 | 9 | 10 | 11 | 12 | 13 |
| Formulation composition | Antistatic agent | (Z-1) | — | — | — | — | — | — | — | — | — | — | — |
| | | (Z-2) | — | — | — | — | — | — | — | — | — | — | — |
| | | (Z-3) | — | — | — | — | — | — | — | — | — | — | — |
| | | (Z-4) | — | — | — | — | — | — | — | — | — | — | — |
| | | (Z-5) | — | — | — | — | — | — | — | — | — | — | — |
| | | (Z-6) | — | — | — | — | — | — | — | — | — | — | — |
| | | (Z-7) | — | — | — | — | — | — | — | — | — | — | — |
| | | (Z-8) | — | — | — | — | — | — | — | — | — | — | — |
| | | (Z-10) | — | — | — | — | — | — | — | — | — | — | — |
| | | (Z-11) | — | — | — | — | — | — | — | — | — | — | — |
| | | (Z-12) | — | — | — | — | — | — | — | — | — | — | — |
| | | (Z-13) | — | — | — | — | — | — | — | — | — | — | — |
| | | (A1-1) | 3 | 15 | — | — | — | — | — | — | — | — | — |
| | | (A2-1) | — | — | — | 3 | 15 | — | — | — | — | — | — |

TABLE 3-continued

| | | | Comparative Example | | | | | | | | | | |
|---|---|---|---|---|---|---|---|---|---|---|---|---|---|
| | | | 3 | 4 | 5 | 6 | 7 | 8 | 9 | 10 | 11 | 12 | 13 |
| | | (Z'-1) | — | — | 3 | — | — | — | — | — | — | — | — |
| | | (Z'-2) | — | — | — | — | — | 3- | — | — | — | — | — |
| | Thermoplastic | (C-1) | 100 | 100 | 100 | 100 | 100 | 100 | 100 | — | — | — | — |
| | resin | (C-2) | — | — | — | — | — | — | — | 100 | — | — | — |
| | | (C-3) | — | — | — | — | — | — | — | — | 100 | — | — |
| | | (C-4) | — | — | — | — | — | — | — | — | — | 100 | — |
| | | (C-5) | — | — | — | — | — | — | — | — | — | — | 100 |
| | Antistatic | (D1-1) | 0.15 | 0.75 | 0.15 | 0.15 | 0.75 | 0.15 | — | — | — | — | — |
| | promoter | (D1-2) | — | — | — | — | — | — | — | — | — | — | — |
| | Compatibilizer | (D2-1) | — | — | — | — | — | — | — | — | — | — | — |
| | Antioxidant | (D4-1) | 0.1 | 0.1 | 0.1 | 0.1 | 0.1 | 0.1 | — | — | — | — | — |
| Evaluation of molded article | Surface intrinsic resistance ($\Omega$) | | $2\times10^{14}$ | $8\times10^{10}$ | $1\times10^{14}$ | $1\times10^{13}$ | $5\times10^{10}$ | $1\times10^{13}$ | $8\times10^{15}$ | $1\times10^{16}$ | $5\times10^{15}$ | $1\times10^{16}$ | $2\times10^{16}$ |
| | Surface intrinsic resistance ($\Omega$) after washing | | $2\times10^{14}$ | $8\times10^{10}$ | $1\times10^{14}$ | $1\times10^{13}$ | $5\times10^{10}$ | $1\times10^{13}$ | $8\times10^{15}$ | $1\times10^{16}$ | $5\times10^{15}$ | $1\times10^{16}$ | $2\times10^{16}$ |
| | Izod impact strength (J/m) | | 100 | 90 | 100 | 100 | 80 | 100 | 110 | 150 | 90 | 90 | 80 |
| | Appearance | Surface | ○ | X | ○ | ○ | X | ○ | ○ | ○ | ○ | ○ | ○ |
| | | Cross section | ○ | X | ○ | ○ | X | ○ | ○ | ○ | ○ | ○ | ○ |

From Tables 2 and 3, it is known that the antistatic resin composition of the invention provides a molded article having an excellent permanent antistatic property, even in a case that the content of the antistatic agent (Z) of the invention is less, and also provides the molded article with an excellent appearance and mechanical strength.

INDUSTRIAL APPLICABILITY

The antistatic agent of the invention provides a thermoplastic resin molded article with an excellent permanent antistatic property without impairing the mechanical strength or good appearance of the molded article. Therefore, it may be widely used for housing products (home appliances, office automation (OA) machines, game machines, commercial machines, etc.), plastic container materials [trays used in a clean room (an integrated circuit (IC) tray, etc.) and other containers, etc.], various buffer materials, packaging materials (packaging films, protective films, etc.), sheets of flooring material, artificial grass, felt, substrates of a tape (for semiconductor fabrication process), and materials for various molded articles (automobile parts, etc.), molded through various molding methods [injection molding, compression molding, calendering, slush molding, rotational molding, extrusion molding, blow molding, foam molding, film molding (cast method, tenter method, inflation method, etc.)], and is very usable.

What is claimed is:
1. An antistatic agent (Z), comprising:
a block polymer (A) containing a block of hydrophobic polymer (a) and a block of hydrophilic polymer (b) as constituent units; and
an organic fluorine-modified polyolefin (B),
wherein a number average molecular weight of (B) is 500-30,000.
2. The antistatic agent (Z) of claim 1, wherein (A) is the following (A1) and/or (A2):
(A1): a polyetheresteramide obtained by reacting (a1) and (b1) and/or (b2), wherein (a) is a polyamide (a1), and (b) is a polyether (b1) and/or a polyether-containing hydrophilic polymer (b2);
(A2): a block polymer having a structure formed by bonding a block of (a2) and a block of hydrophilic polymer (b) through one or more bonds selected from a group consisting of an ester bond, an amide bond, an ether bond, an imide bond, a urethane bond and a urea bond, wherein (a) is a polyolefin (a2).
3. The antistatic agent (Z) of claim 1, wherein a weight ratio of the block of (a) constituting (A) to the block of (b) constituting (A) is 10/90-80/20.
4. The antistatic agent (Z) of claim 2, wherein (b) constituting (A2) is one or more selected from a group consisting of the polyether (b1), the polyether-containing hydrophilic polymer (b2), a cationic polymer (b3) and an anionic polymer (b4).
5. The antistatic agent (Z) of claim 1, wherein a number average molecular weight of (A) is 2,000-1,000,000.
6. The antistatic agent (Z) of claim 1, wherein a number average molecular weight of (a) is 800-25,000.
7. The antistatic agent (Z) of claim 1, wherein a volume intrinsic resistance of (b) is $1\times10^5$-$1\times10^{11}$ $\Omega\cdot$cm.
8. The antistatic agent (Z) of claim 1, wherein a number average molecular weight of (b) is 180-20,000.
9. The antistatic agent (Z) of claim 1, wherein (B) is an organic fluorine-modified polyolefin having at least one fluorohydrocarbon group at a molecular end and/or at a molecular side chain of the polyolefin.
10. The antistatic agent (Z) of claim 1, wherein the content of fluorine in (B) is 0.1-80 wt % based on the weight of (B).
11. The antistatic agent (Z) of claim 1, wherein a weight ratio of (A) to (B) is 99/1-50/50.
12. The antistatic agent (Z) of claim 1, wherein the content of fluorine in (Z) is 0.0001-30 wt % based on the weight of (Z).
13. An antistatic resin composition comprising the antistatic agent (Z) of claim 1 in a thermoplastic resin (C).
14. The antistatic resin composition of claim 13, wherein (C) is one or more selected from a group consisting of a polyphenylene ether resin, a vinyl resin, a poly(meth)acrylic resin, a polystyrene resin, a polyester resin, a polyamide resin, a polycarbonate resin, and a polyacetal resin.
15. The antistatic resin composition of claim 13, wherein the content of (Z) is 1-10 wt % based on the weight of (C).
16. The antistatic resin composition of claim 13, further comprising one or more antistatic promoters (D) selected from a group consisting of an alkali metal salt or an alkaline earth metal salt, a quaternary ammonium salt, a surfactant, and an ionic liquid.

17. A molded article formed by molding the antistatic resin composition of claim 13.

18. A molded product formed by coating and/or printing the molded article of claim 17.

* * * * *